(12) United States Patent
Soejima et al.

(10) Patent No.: US 8,209,104 B2
(45) Date of Patent: Jun. 26, 2012

(54) CONTROL DEVICE FOR VEHICLE DRIVE UNIT

(75) Inventors: Shinichi Soejima, Gotenba (JP); Junichi Kako, Susono (JP); Kaoru Ohtsuka, Mishima (JP); Hiroyuki Tanaka, Susono (JP); Keisuke Kawai, Odawara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 183 days.

(21) Appl. No.: 12/670,746

(22) PCT Filed: Oct. 1, 2008

(86) PCT No.: PCT/JP2008/067846
§ 371 (c)(1),
(2), (4) Date: Jan. 26, 2010

(87) PCT Pub. No.: WO2009/044779
PCT Pub. Date: Apr. 9, 2009

(65) Prior Publication Data
US 2010/0268436 A1    Oct. 21, 2010

(30) Foreign Application Priority Data

Oct. 5, 2007   (JP) ................................ 2007-262636

(51) Int. Cl.
*G06F 17/00* (2006.01)
*F02P 5/00* (2006.01)
*B60W 10/10* (2012.01)

(52) U.S. Cl. ..... 701/102; 701/54; 701/103; 123/406.23; 123/406.52; 477/109

(58) Field of Classification Search ............. 123/339.11, 123/406.19, 406.23, 406.52; 701/54, 102, 701/103; 477/102, 109
See application file for complete search history.

(56) References Cited

U.S. PATENT DOCUMENTS

| 2,092,269 A | * | 9/1937 | Zoerlein ................. 123/406.67 |
| 4,724,723 A | * | 2/1988 | Lockhart et al. .............. 477/102 |
| 5,038,287 A | * | 8/1991 | Taniguchi et al. .............. 701/99 |

(Continued)

FOREIGN PATENT DOCUMENTS

JP       A 4-63945       2/1992
(Continued)

OTHER PUBLICATIONS

International Search Report issued for International Application No. PCT/JP2008/067846 on Dec. 2, 2008.

Primary Examiner — Mahmoud Gimie
Assistant Examiner — David Hamaoui
(74) Attorney, Agent, or Firm — Olidd & Berridge, PLC

(57) ABSTRACT

This invention is intended to ensure that a control device for a vehicle drive unit is capable of realizing desired torque by making the main-actuator and sub-actuator collaborate adequately while holding the interposition of the sub-actuator as low as possible. For this end, a future target of torque that is going to be output from the engine and a realization timing of the future target are taken as reservation information for reserving engine torque regulation. Next, the required period, which is required to realize the future target when a main-actuator (a throttle) is operated to regulate the torque, is computed from a current engine operating condition. Then, the operation of the main-actuator is started at the timing preceding the realization timing by the required period for realizing the future target. In parallel with that, a sub-actuator (an ignition system) is operated to cancel out a torque change induced by the operation of the main-actuator during the period from the start timing of the operation of the main-actuator to the realization timing.

5 Claims, 11 Drawing Sheets

U.S. PATENT DOCUMENTS

| | | | |
|---|---|---|---|
| 5,211,680 A * | 5/1993 | Sumimoto et al. | 477/109 |
| 5,421,302 A * | 6/1995 | Livshits et al. | 123/339.23 |
| 5,445,124 A * | 8/1995 | Tomisawa et al. | 123/339.11 |
| 5,577,474 A * | 11/1996 | Livshiz et al. | 123/352 |
| 5,816,976 A * | 10/1998 | Kuroiwa et al. | 477/102 |
| 6,959,692 B2 * | 11/2005 | Song et al. | 123/406.45 |
| 7,351,183 B2 * | 4/2008 | Fujii et al. | 477/109 |

FOREIGN PATENT DOCUMENTS

| | | |
|---|---|---|
| JP | A 6-207571 | 7/1994 |
| JP | A 7-259616 | 10/1995 |
| JP | A 11-336591 | 12/1999 |
| JP | A 11-351044 | 12/1999 |
| JP | A 2004-346868 | 12/2004 |
| JP | A 2007-113555 | 5/2007 |

* cited by examiner

Fig.5
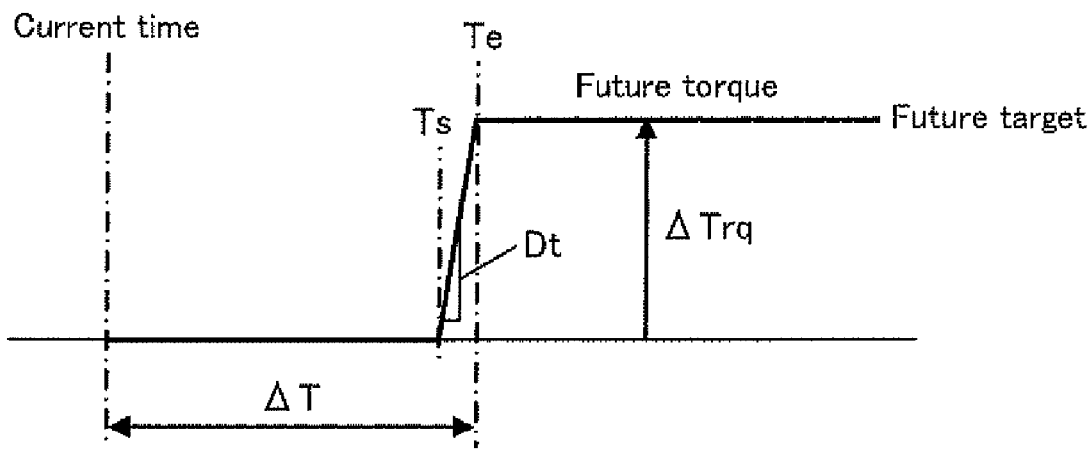
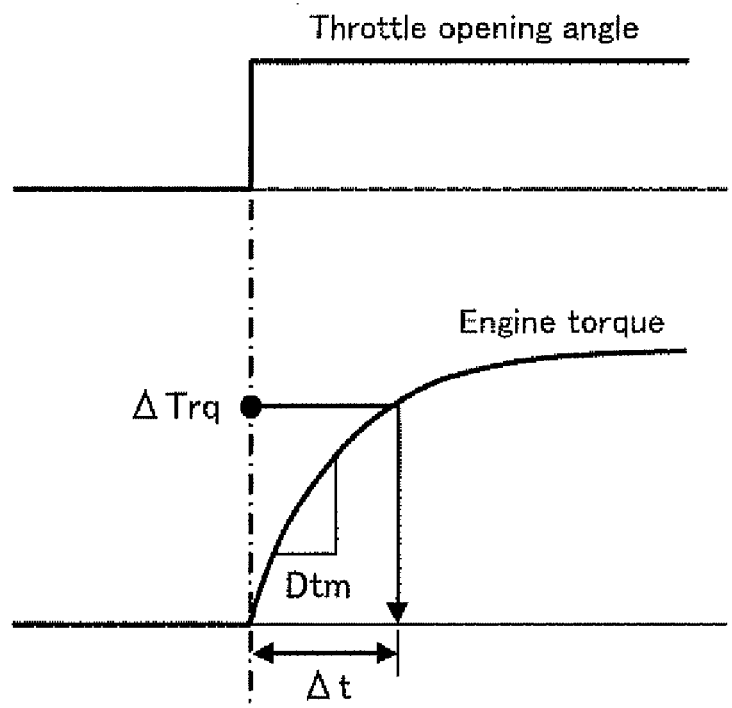
Fig.6A
Fig.6B

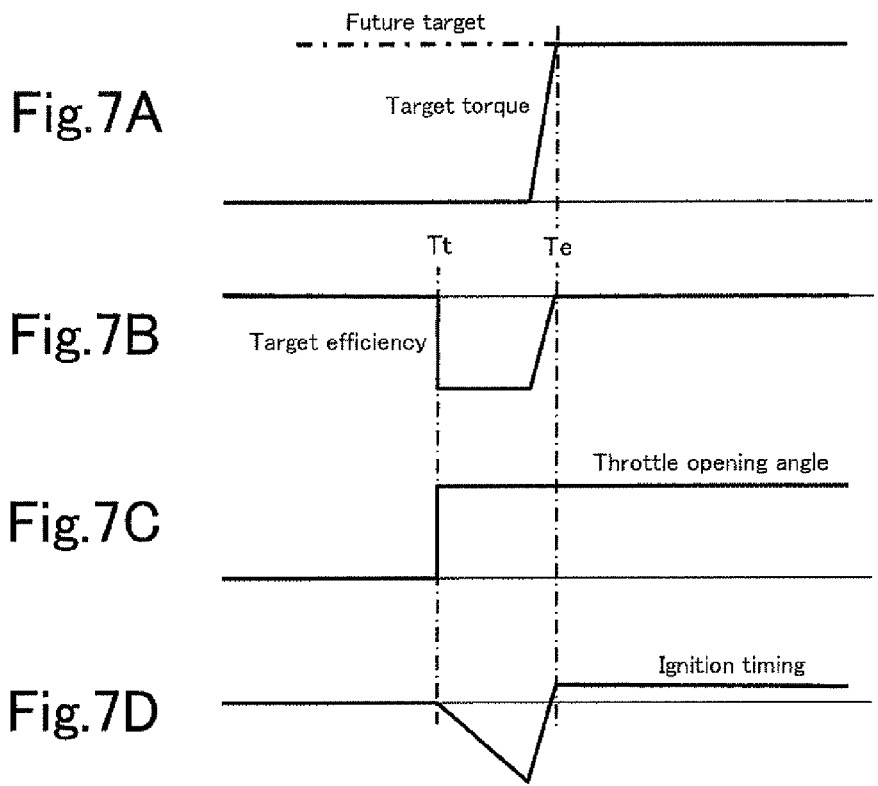
Fig.7A
Fig.7B
Fig.7C
Fig.7D
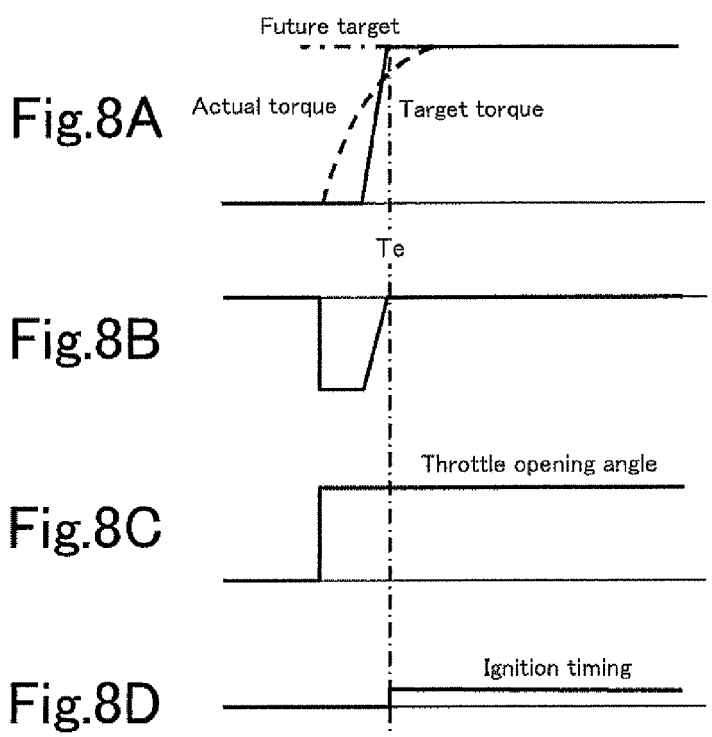
Fig.8A
Fig.8B
Fig.8C
Fig.8D

Fig.14
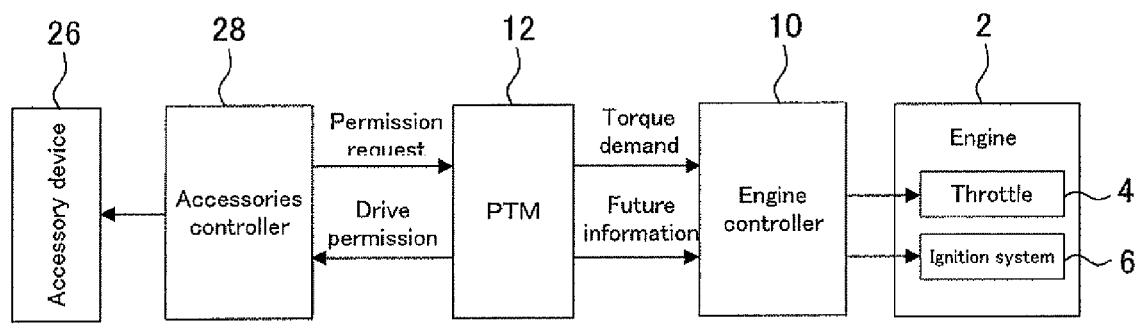
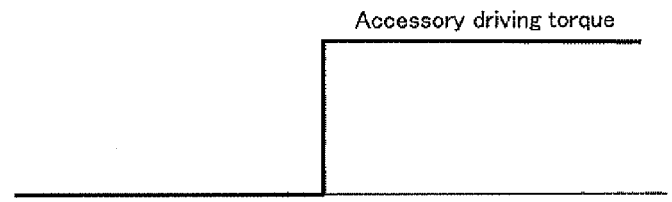
Fig.15A
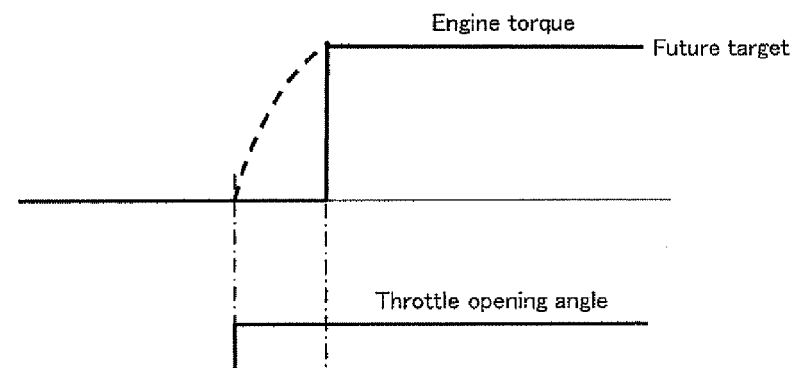
Fig.15B
Fig.15C
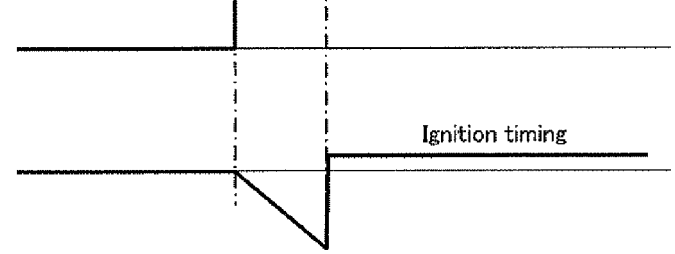
Fig.15D

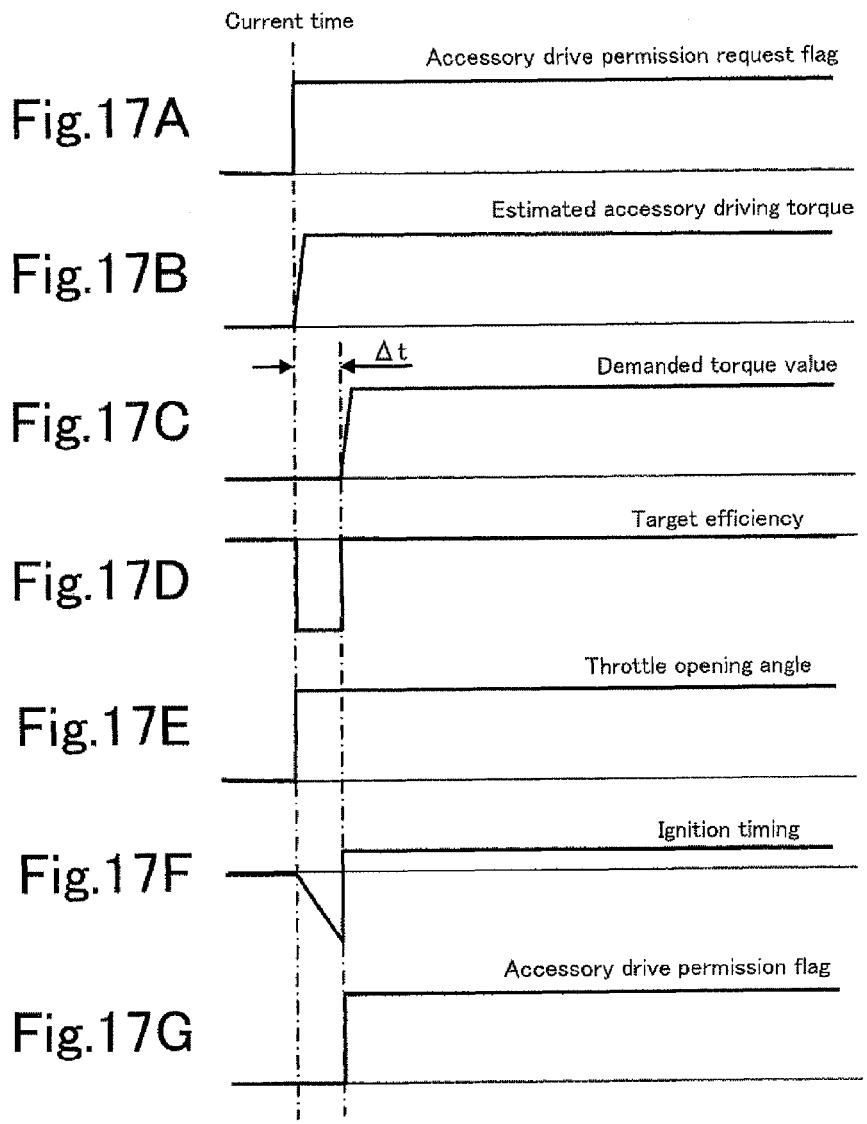
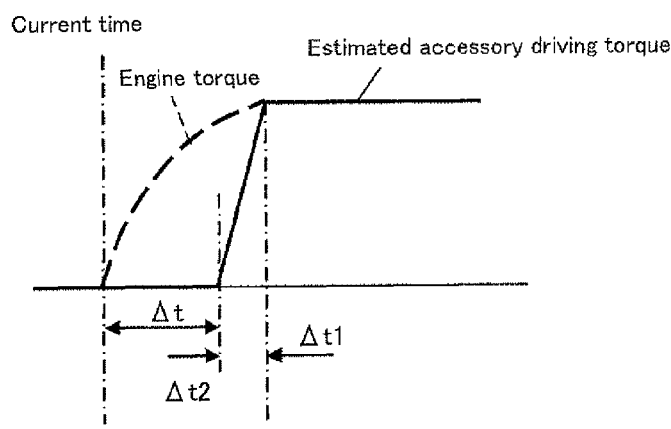

CONTROL DEVICE FOR VEHICLE DRIVE UNIT

FIELD OF THE INVENTION

The present invention relates to a control device for a vehicle drive unit having an internal combustion engine as a power plant, in particular, a control device comprising a main-actuator and a sub-actuator which are capable of regulating torque of the internal combustion engine independently of each other.

BACKGROUND ART

An internal combustion engine is used as a power plant of a vehicle drive unit for an automobile. As for a spark-ignited internal combustion engine, it is equipped with a throttle and an ignition system as actuators for regulating the torque. A throttle can be used to regulate torque by controlling an intake air amount. An ignition system can be used to regulate torque by an ignition timing.

There exist both advantages and disadvantages about each actuator. If a throttle and an ignition system are taken for examples, the advantage of the ignition system while comparing with the throttle is in its superior torque response to an operation. However, there also exists a disadvantage of giving high impact on fuel consumption, an exhaust gas characteristic, a knock characteristic or the like about an ignition system. Thus, in order to realize a desired torque while keeping basic characteristics required for a vehicle drive unit such as fuel consumption at a high level, it is necessary to operate each actuator adequately in accordance with an individual characteristic thereof.

Conventionally, the art disclosed in Japanese Patent Laid-Open No. Hei6-207571, for example, is known as an art for regulating engine torque by making two actuators with different characteristic collaborate. The art disclosed here makes a throttle and an ignition system collaborate so that the torque of the internal combustion engine can follow rapid increase of target torque at the time of a gear shifting operation. More specifically, at the time of the gear shifting operation, the throttle is opened before the target torque is increased so that the intake air amount is increased in advance of an increase of the target torque. Also, the system in the art cancels the torque change with an increase of the intake air amount by retarding the ignition timing at the same time the throttle is opened. Then, from the time the target torque is increased, the intake air amount is further increased while the retarded ignition timing becomes returned.

DISCLOSURE OF THE INVENTION

Problem to be Solved by the Invention

However, the art disclosed in Japanese Patent Laid-Open No. Hei6-207571 has the room of an improvement in satisfying both of target torque realization capability and fuel consumption characteristic as described below.

The art disclosed in Japanese Patent Laid-Open No. Hei6-207571 prevents the torque from increasing in advance of an increase of the target torque by retarding the ignition timing at the same time the intake air amount is increased. However, the retard of the ignition timing worsens the fuel consumption characteristic. Accordingly, it is desirable that the advance period during which the intake air amount is increased in advance of an increase of the target torque, that is the time in which the torque change with an increase of the intake air amount is canceled out by the ignition timing, is as short as possible.

In this regard, there is neither description nor suggestion about how the above advance period is determined in Japanese Patent Laid-Open No. Hei6-207571. Therefore, depending on the value of the advance period that is actually set, the ignition timing may be uselessly retarded long time to deteriorate the fuel consumption. On the contrary, there also exists a possibility that, because of the shortness of the advance period, the target torque cannot be realized due to the lack of the intake air amount.

The above-mentioned problem about the art described in Japanese Patent Laid-Open No. Hei6-207571 can be read as the suggestion of the following common problem for a vehicle drive unit which uses an internal combustion engine as a power plant.

There are a plurality of actuators that are available for regulating torque of the internal combustion engine in the vehicle drive unit. The throttle and the ignition system are just examples of those. It is possible to regulate the torque also by a fuel injection system or an air fuel ratio regulating system, a valve lift amount variable system, an exhaust gas recirculation system, a compression ratio variable system or the like. When two actuators are taken into account among the plurality of actuators, the one that has lesser impact on capabilities of the vehicle drive unit such as the fuel consumption can be identified as a main-actuator, and the other that has greater influence on them but makes the torque respond promptly to its operation can be identified as a sub-actuator. In the case of the art described in Japanese Patent Laid-Open No. Hei6-207571, the throttle is identified as the main-actuator, and the ignition system is identified as the sub-actuator.

When the main-actuator and sub-actuator are made to collaborate to realize desired torque, there are several operation patterns of each actuator which can be adopted. However, when the impact on capabilities of the vehicle drive unit is also considered, the preferred operation pattern is restricted to a certain pattern. The certain pattern is an operation pattern by which the interposition of the sub-actuator can be held as low as possible. If the main-actuator and sub-actuator can adequately collaborate in such an operation pattern, it will be possible to realize a desired torque while keeping the capabilities of the vehicle drive unit at a high level.

The present invention has been made to solve the problem described above. An object of the present invention is to provide a control device for a vehicle drive unit that is capable of realizing desired torque by making the main-actuator and sub-actuator collaborate adequately while holding the interposition of the sub-actuator as low as possible.

Means for Solving the Problem

In order to attain the object described above, a first aspect of the present invention is a control device for a vehicle drive unit having an internal combustion engine as a power plant, the control device comprising:

vehicle control means which performs control concerning the drive condition of a vehicle by regulating a torque output by the internal combustion engine;

a main-actuator used for regulating the torque of the internal combustion engine;

a sub-actuator which makes the torque respond to its operation more promptly than the main-actuator does, and is used for torque regulation of the internal combustion engine independently of the main-actuator;

reservation information taking means which receives a reservation of torque regulation supplied from the vehicle control means to the internal combustion engine, and takes as reservation information at least a future target of the torque that is going to be output from the internal combustion engine and a realization timing of the future target;

required period computing means which computes based on a current engine operating condition the period required to realize the future target under a situation in which the torque of the internal combustion engine is regulated by operating the main-actuator;

main-actuator control means which starts the operation of the main-actuator at the timing preceding the realization timing by the required period for realizing the future target; and sub-actuator control means which operates the sub-actuator to cancel the torque change induced by the operation of the main-actuator during the period from the start of the operation of the main-actuator to the realization timing.

A second aspect of the present invention is the control device for a vehicle drive unit according to the first aspect of the present invention, wherein the reservation information taken by the reservation information taking means includes a start timing of the torque regulation and a time change rate of torque approaching to the future target; and the main-actuator control means starts the operation of the main-actuator at the start timing of the torque regulation when the time change rate is possible to be realized by the main-actuator.

A third aspect of the present invention is the control device for a vehicle drive unit according to the first or second aspect of the present invention, further comprising:

determination means for determining whether the period remaining before the realization timing is enough for the required period; wherein the main-actuator control means starts the operation of the main-actuator immediately when the remaining period is not enough for the required period; and the sub-actuator control means operates the sub-actuator when a condition of that the remaining period is enough for the required period is satisfied.

A fourth aspect of the present invention is the control device for a vehicle drive unit according to any one of the first to the third aspects of the present invention, wherein the internal combustion engine is a spark-ignited internal combustion engine;

the main-actuator is an actuator that regulates an intake air amount of the internal combustion engine; and the sub-actuator is an actuator that regulates an ignition timing of the internal combustion engine.

A fifth aspect of the present invention is the control device for a vehicle drive unit according to the fourth aspect of the present invention, wherein the torque regulation reserved on the internal combustion engine by the vehicle control means is to regulate the torque to increase.

Alternatively, in order to attain the object described above, a sixth aspect of the present invention is a control device for a vehicle drive unit having an internal combustion engine as a power plant, the control device comprising:

a torque consuming element which consumes the torque output by the internal combustion engine;

a main-actuator used for regulating the torque of the internal combustion engine;

a sub-actuator which makes the torque respond to its operation more promptly than the main-actuator does, and is used for torque regulation of the internal combustion engine independently of the main-actuator;

future target setting means which receives a request for granting permission to change the torque consumption from the torque consuming element, and sets a future target of the torque that is going to be output from the internal combustion engine in accordance with the torque consumption estimated after the change;

required period computing means which computes from a current engine operating condition the period required for realizing the future target under a situation in which the torque of the internal combustion engine is regulated by operating the main-actuator;

main-actuator control means which starts the operation of the main-actuator for realizing the future target;

permission means which sets a waiting period on the basis of the required period, and grants the torque consuming element a permission to change the torque consumption at the timing when the waiting period has passed since the start of the operation of the main-actuator; and sub-actuator control means which operates the sub-actuator to cancel the torque change induced by the operation of the main-actuator during the period from the start of the operation of the main-actuator until the permission to change the torque consumption is granted to the torque consuming element.

A seventh aspect of the present invention is the control device for a vehicle drive unit according to the sixth aspect of the present invention, further comprising:

delay period computing means which computes the delay period from the time when the permission to change the torque consumption is granted to the torque consuming element until the change is actually completed; and wherein the period that is computed by deducting the delay period from the required period is set as the waiting period.

An eighth aspect of the present invention is the control device for a vehicle drive unit according to the sixth or seventh aspect of the present invention, wherein the internal combustion engine is a spark-ignited internal combustion engine;

the main-actuator is an actuator that regulates an intake air amount of the internal combustion engine; and the sub-actuator is an actuator that regulates an ignition timing of the internal combustion engine.

A ninth aspect of the present invention is the control device for a vehicle drive unit according to the eighth aspect of the present invention, wherein the request for granting permission to change the torque consumption from the torque consuming element is a request for granting permission to increase the torque consumption.

Effect of the Invention

According to the first aspect of the present invention, when the reservation of the torque regulation is received, computed from the current engine operating condition is the period required to realize the future target of torque included in the reservation information, which is the period required when the main-actuator is operated to regulate the torque of the internal combustion engine. Then, at the timing preceding the reserved realization timing by the required period, the operation of the main-actuator is started for realizing the reserved future target. Such advancing operation of the main-actuator makes it possible to realize surely the reserved future target of torque just at the reserved realization timing.

Furthermore, according to the first aspect of the present invention, the sub-actuator is operated in parallel with the operation of the main-actuator to cancel out torque change induced by the operation of the main-actuator during the period from the start of the operation of the main-actuator to the reserved realization timing. Such operation of the sub-actuator makes it possible to suppress an unnecessary torque change before the reserved realization timing. Also, because the required period is neither too short nor too long to realize the future target at the reserved realization timing, and the sub-actuator is operated within the required period, it is possible to minimize the operating period of the sub-actuator. Thus, according to the first aspect of the present invention, the realization of desired torque is achieved with the interposition of the sub-actuator held to the minimum necessary.

According to the second aspect of the present invention, when the time rate of torque change to the future target is achieved by the operation of the main-actuator alone, the torque regulation is performed only by the operation of the main-actuator. And only when it is impossible to achieve it by the operation of the main-actuator, the torque regulation with the interposition of the sub-actuator is performed. Thus, when the reservation information includes the start timing of the torque regulation and the time rate of torque change to the future target, by performing the collaboration control of the main-actuator and sub-actuator on the basis of such information, it becomes possible to perform the torque regulation with a desired time rate while holding the interposition of the sub-actuator to the minimum necessary.

According to the third aspect of the present invention, when the remaining period before the reserved realization timing comes is not enough for the required period, the future target is realized to the extent possible in the reserved realization timing by the prompt operation start of the main-actuator. Also, in such a situation that the remaining period is short, the operation of the sub-actuator can not be very effective in suppressing the torque change. Consequently, by operating the sub-actuator on condition that the remaining period is enough, useless operation of the sub-actuator is prevented.

According to the fourth aspect of the present invention, torque is regulated without giving a big impact on the fuel consumption and exhaust gas by regulating the intake air amount by the main-actuator. Also, torque is regulated with high response by regulating the ignition timing by the sub-actuator. By performing the collaboration control of these actuators like any one of the first to the third aspects of the present invention, it becomes possible to realize desired torque while minimizing an impact on the fuel consumption and exhaust gas.

According to the fifth aspect of the present invention, the toque regulation to increase the torque is accomplished by minimum ignition retard with the primal use of the regulation of the intake air amount. Concretely, when the torque-increase regulation is reserved, the intake air amount is increased in advance of the reserved realization timing. And the ignition timing is retarded to cancel out the torque increase induced by an increase of the intake air amount during the period from the start of an increase of the intake air amount to the reserved realization timing. This makes it possible to realize desired torque while minimizing deterioration of fuel consumption caused by the ignition retard.

According to the sixth aspect of the present invention, when the request for granting permission to change the torque consumption is received, the future target of torque is set in accordance with the torque consumption estimated after the change. Also, the period required to realize the future target, which is the period required when the main-actuator is operated to regulate the torque of the internal combustion engine, is computed from the current engine operating condition. Then, the operation of the main-actuator is started toward the realization of the future target. And, the torque consuming element is permitted to change the torque consumption after the passage of the waiting period that is set on the basis of the required period. As above, by making the operation-start of the main-actuator precede the permission for changing the torque consumption, it becomes possible to realize surely and in a short time the torque balanced with the torque consumption after the change.

Furthermore, according to the sixth aspect of the present invention, the sub-actuator is operated in parallel with the operation of the main-actuator to cancel out a torque change induced by the operation of the main-actuator during the period from the start of the operation of the main-actuator until the permission for changing the torque consumption is granted. Such operation of the sub-actuator makes it possible to suppress an unnecessary torque change before the torque consumption is changed. Also, because the waiting period is neither too short nor too long to realize the future target that is balanced with the torque consumption, and the sub-actuator is operated within the waiting period, it is possible to minimize the operating period of the sub-actuator. Thus, according to the sixth aspect of the present invention, it is possible to realize the torque that is balanced with the torque consumption by the torque consuming element while holding the interposition of the sub-actuator to the minimum necessary.

According to the seventh aspect of the present invention, the waiting period is set in consideration of the delay period from when the permission for changing the torque consumption is granted until the change is actually completed. This makes it possible to prevent imbalance between the torque output from the internal combustion engine and the torque consumption by the torque consuming element, and makes it possible for the vehicle drive unit to keep desired torque as a whole. Also, the interposition of the sub-actuator is held to the minimum necessary by the optimization of the waiting period.

According to the eighth aspect of the present invention, torque is regulated without giving a big impact on the fuel consumption and exhaust gas by regulating the intake air amount by the main-actuator. Also, torque is regulated with high response by regulating the ignition timing by the sub-actuator. By performing the collaboration control of these actuators like the sixth or seventh aspect of the present invention, it becomes possible to realize the desired torque balanced with the torque consumption while minimizing an impact on the fuel consumption and exhaust gas.

According to the ninth aspect of the present invention, the toque regulation to increase the torque with an increase of the torque consumption is accomplished by minimum ignition retard with the primal use of the regulation of the intake air amount. Concretely, when the permission for changing the torque consumption is requested, the intake air amount is increased in advance of the grant of the permission for changing. And the ignition timing is retarded to cancel out the torque increase induced by an increase of the intake air amount during the period from the time when the intake air amount begins to increase until the permission to change the torque consumption is granted. This makes it possible to realize desired torque while minimizing deterioration of fuel consumption caused by the ignition retard.

BRIEF DESCRIPTION OF DRAWINGS

FIG. 5 is a time chart to show the format of the future information used in the first embodiment of the present invention;

FIGS. 6A and 6B are time charts to show an example of the torque computation by the engine model;

FIGS. 7A to 7D are time charts to show an example of the control result by the control device of the first embodiment of the present invention;

FIGS. 8A to 8D are time charts to show an example of the control result by the control device of the first embodiment of the present invention;

FIG. 14 is a block diagram illustrating the configuration of a control device for a vehicle drive unit as a fourth embodiment of the present invention;

FIGS. 15A to 15D are time charts to show illustrative cases of each control pattern of a throttle opening angle and ignition timing compared to the drive timing of an accessory device;

FIGS. 17A to 17G are time charts to show an example of the control result by the control device of the fourth embodiment of the present invention; and FIG. 18 is a time chart to show a procedure for computing the waiting time before starting the drive of an accessory device.

Figure 1:
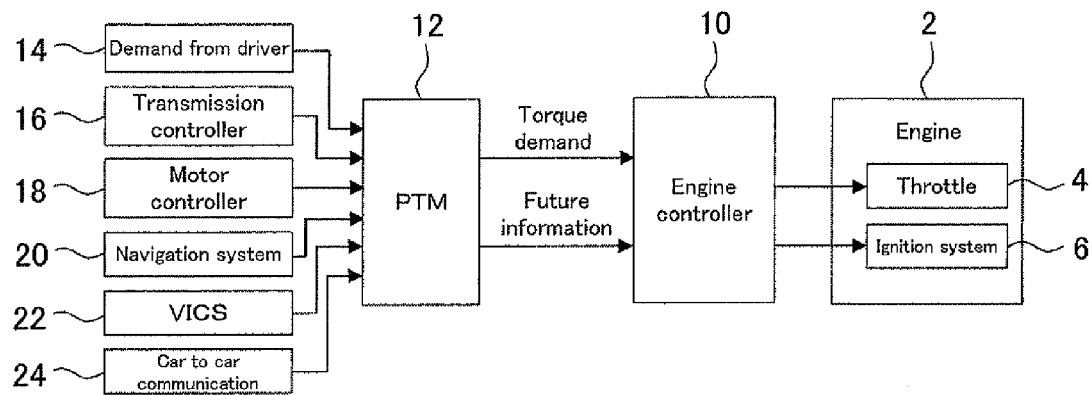
FIG. 1 is a block diagram illustrating the configuration of a control device for a vehicle drive unit as a first embodiment of the present invention.

DESCRIPTION OF NOTATIONS 2 engine
4 throttle as main-actuator
6 ignition system as sub-actuator
10, 30 engine controller
12 power train manager
14 accelerator sensor
16 transmission controller
18 motor controller
20 navigation system
22 VICS
24 car to car communication system
26 accessory device
28 accessories controller

BEST MODE FOR CARRYING OUT THE INVENTION

First Embodiment

FIG. 1 is a block diagram illustrating the configuration of a control device for a vehicle drive unit as a first embodiment of the present invention. The control device of the present embodiment is configured as the control device of a vehicle drive unit having a spark-ignited internal combustion engine 2 (hereinafter referred to as an engine) as the power plant. The configuration of the control device of the present embodiment is explained referring to FIG. 1 as follows.

The control device of the present embodiment includes an engine controller 10 controlling the engine 2 directly. Two types of actuators 4, 6 concerning the torque control of the engine 2 are connected to the engine controller 10. These actuators 4, 6 are operated in response to input signals and make the engine 2 realize the torque in accordance with the operation. The present embodiment performs the torque regulation of the engine 2 by making these actuators 4, 6 collaborate. However, two actuators 4, 6 are not equal as concerns the torque regulation. One actuator 4 is a main-actuator, which is used mainly, and the other 6 is a sub-actuator, which is used subsidiary.

In the present embodiment, a throttle is used as the main-actuator 4, and an ignition system is used as the sub-actuator 6. The throttle as the main-actuator 4 is the actuator that regulates an intake air amount to a cylinder by its opening angle and is capable of controlling the torque of the engine 2 by the intake air amount. The ignition system, which is the sub-actuator 6, is the actuator that is capable of controlling the torque of the engine 2 by its ignition timing. The ignition system is characterized in that it makes the torque respond to its operation more promptly than the throttle. In the following, the main-actuator 4 may be transcribed into the throttle 4, and the sub-actuator 6 may be transcribed into the ignition system 6.

In the control system of the vehicle drive unit, a power train manager 12, which is superior to the engine controller 10, is provided. The power train manager 12 regulates the torque output from the engine 2 with the help of the engine controller 10; the drive condition of the vehicle is controlled thereby. Connected to the power train manager 12 are various devices 16, 18, 20, 22, 24 concerning the vehicle control other than an accelerator sensor 14 which detects a torque demand from the vehicle driver. The power train manager 12 computes a torque that should be outputted from the engine 2 at the present moment on the basis of the information from these devices, and outputting it as a torque demand to the engine controller 10.

The power train manager 12 computes a future torque that is necessary for vehicle control in the future as well as the torque which is necessary for vehicle control at the present moment. The computed future torque will be output to the engine controller 10 as future information. This operation functions as a reservation of the torque regulation of the engine 2 by the power train manager 12. The future information received by the engine controller 10 is treated as the reservation information. The control schedule of the engine 2 will be made in accordance with the content of the reservation information.

The power train manager 12 uses information from various devices 16, 18, 20, 22, 24 for computing the future torque. For example, information from a transmission controller 16, which concerns with the gear shifting operation of the transmission, is received beforehand. When the gear shifting operation is performed, torque may fluctuate at the down stream of the transmission. However, the power train manager 12 can compute a torque that is necessary for absorbing the torque fluctuations beforehand by receiving the information about the fluctuation beforehand. This torque is reserved to the engine controller 10 as a future torque of the engine 2 so that it becomes possible to regulate the torque appropriately when the gear shifting operation is performed subsequently.

Besides, when the vehicle drive unit is a hybrid system provided with an engine and a electric motor, it is possible to receive beforehand the information concerning running or stoppage of the motor from a motor controller 16. By using the information, it becomes possible to compute beforehand a torque that is necessary for absorbing the torque fluctuations induced by starting or stopping of the motor, and to reserve the computed result to the engine controller 10. This makes it possible to regulate a torque appropriately when the motor is started or stopped subsequently.

In addition, if a telecommunication system such as a navigation system 20, a Vehicle Information and Communication System 22 or a car to car communication system 24 is provided, it becomes possible to predict the situation in which a vehicle will be placed in the future by using the information from such a system. When a torque that is suitable for the predicted situation is computed beforehand and reserved to the engine controller 10, the torque is appropriately regulated so as to accord with the situation in which the vehicle will be placed subsequently. For example, it is possible to predict a climbing angle of a hill lying ahead by utilizing an information from the navigation system 20. If necessary torque is computed from the predicted hill-climbing angle and is reserved to the engine controller 10, deceleration at the hill-climbing is prevented by increasing torque at the right time.

Also, in a case of a drive-by-wire system such as the present embodiment, a signal of the accelerator sensor 14, i.e., a torque demand from the driver can be output to the engine controller 10 not directly but after being subjected to a delay processing. In this case, the signal of the accelerator sensor 14 presents the future torque.

Figure 2:
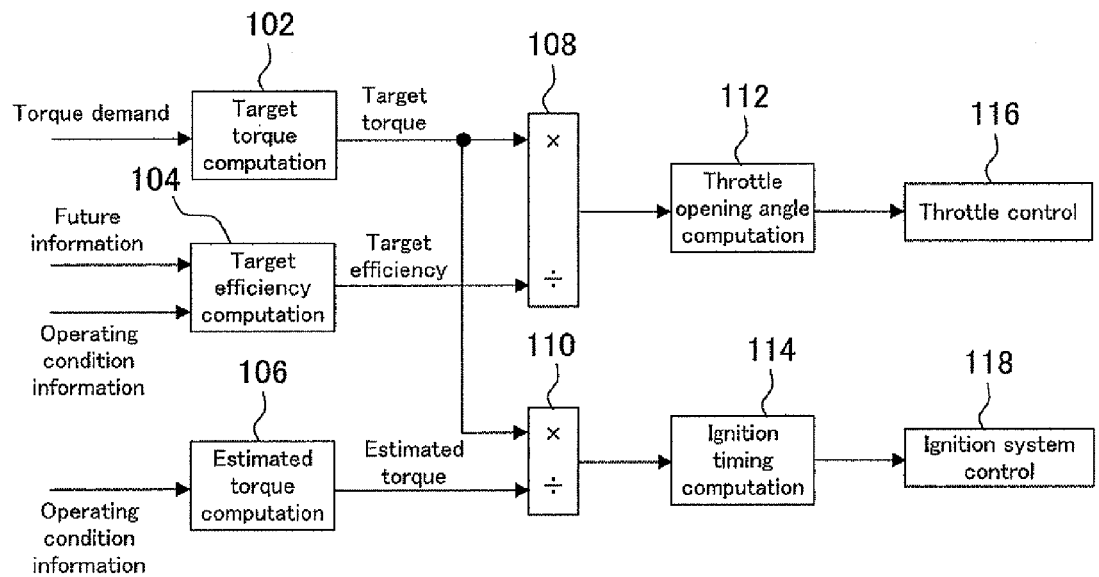
FIG. 2 is a block diagram illustrating the configuration of an engine controller according to the first embodiment of the present invention.

FIG. 2 is a block diagram illustrating the configuration of the engine controller 10. As shown in this figure, the engine controller 10 comprises a plurality of computational elements 102, 104, 106, 108, 110, 112, 114. Also, the engine controller 10 comprises a throttle driver 116 which controls an operation of the throttle and an ignition driver 118 which controls an operation of the ignition system. Input into the engine controller 10 are the information concerning an operating condition of the engine 2 as well as the torque demand and future information supplied from the power train manager 12. The information concerning the operating condition includes an engine speed, an output value of an air flow meter, a true ignition timing at present, a circulating water temperature, a valve timing and the like.

A torque demand supplied from the power train manager 12 is input to a target torque computing unit 102. The target torque computing unit 102 computes the target torque of the engine 2 on the basis of the input torque demand. When the target torque is computed, such processing as adding vibration control torque to a demanded torque value is performed. The computed target torque is output to a target torque correcting unit 108 and a torque efficiency computing unit 110 described below.

The future information supplied from the power train manager 12 is input to a target efficiency computing unit 104 with the operating condition information. The target efficiency computing unit 104 computes the target efficiency on the basis of the input future information. Also, an output timing or change timing of the target efficiency will be computed on the basis of the future information and the operating condition information. The computed target efficiency is output to a target torque correcting unit 108 described below. The target efficiency is usually set to 1. Because the target efficiency and the computation of its output timing are one of the important parts of the present embodiment, more information about them will be described later.

The estimated torque computing unit 106 estimates the torque of the engine 2 from the operating condition information. More specifically, the estimated torque computing unit 106 assumes the ignition timing as the MBT and computes the estimated torque at the MBT on the basis of prospective air volume that is computed from various operating condition information. The computed estimated torque is output to the torque efficiency computing unit 110 described below.

The target torque and the target efficiency are input into the target torque correcting unit 108. The target torque correcting unit 108 corrects the target torque by dividing it by the target efficiency, outputting the corrected target torque to a throttle opening angle computing unit 112. When the target efficiency is 1 that is the normal value, the target torque computed in the target torque computing unit 102 is output to the throttle opening angle computing unit 112 as it is. On the other hand, when the target efficiency is smaller than 1, the target torque is inflated by being divided by the target efficiency, and then the inflated target torque is output to the throttle opening angle computing unit 112.

The throttle opening angle computing unit 112 converts the corrected target torque supplied from the target torque correcting unit 108 into air volume, computing the opening angle of the throttle 4 to realize the air volume. The opening angle computed in the throttle opening angle computing unit 112 is set to the throttle driver 116 as a target opening angle of the throttle 4. The throttle driver 116 controls the throttle 4 to realize this target opening angle.

The target torque and the estimated torque are input into the torque efficiency computing unit 110. The torque efficiency computing unit 110 computes a ratio of the target torque to the estimated torque. In the present specification, this ratio is defined as torque efficiency. In the transient state during which air volume is changing, the estimated torque changes in response to the air volume, and the torque efficiency changes in response to it. However, in the stationary state where air volume is constant, since the estimated torque corresponds with the corrected target torque, the torque efficiency comes to correspond with the above-mentioned target efficiency. The torque efficiency computing unit 110 outputs the computed torque efficiency to an ignition timing computing unit 114.

The ignition timing computing unit 114, at first, computes a retard quantity from the MBT based on the torque efficiency. A map having at least an axis of torque efficiency is used for computing the retard quantity. According to this computation, the smaller the torque efficiency, the larger the retard quantity is set. Then, a conclusive ignition timing is computed from the retard quantity computed from the torque efficiency and the base ignition timing determined depending on the operating condition of the engine 2. The computed conclusive ignition timing is set to the ignition driver 118 from the ignition timing computing unit 114. The ignition driver 118 controls the ignition system 6 according to the conclusive ignition timing.

According to the configuration of the engine controller 10 described above, the throttle opening angle and ignition timing to realize a target torque are determined uniquely by setting a target efficiency. In a case where the target torque is 100 Nm, for example, when the target efficiency is set to 1, the corrected target torque input to the throttle opening angle computing unit 112 is 100 Nm. The throttle opening angle to generate this corrected target torque (100 Nm) at the MBT, which is set as the target opening angle of the throttle 4, is computed in the throttle opening angle computing unit 112. When air volume becomes constant after the change of the throttle opening angle, the estimated torque computed in the estimated torque computing unit 106 becomes approximately 100 Nm, and the torque efficiency that is a ratio of the target torque to the estimated torque becomes 1. When the torque efficiency is 1, the retard quantity computed in the ignition timing computing unit 114 is zero, and the conclusive ignition timing is set to the MBT.

When the target efficiency is changed to 0.8 while the target torque is the same as above, the corrected target torque becomes 125 Nm. By this, the target opening angle of the throttle 4 is enlarged to the opening angle by which torque of 125 Nm is generated at the MBT. The estimated torque changes following the corrected target torque so as to become approximately 125 Nm. As a result, the torque efficiency that is a ratio of the target torque to the estimated torque becomes 0.8. That is, the torque efficiency also changes following the target efficiency. When the torque efficiency becomes 0.8 which is a smaller value than 1, the conclusive ignition timing is set to a timing that is retarded with respect to the MBT.

When the target efficiency is changed to 0.8, a torque up effect caused by an enlargement of the throttle opening angle occurs. However, at the same time, the ignition timing is retarded, which causes a torque down effect that cancels out the above torque up effect. As a result, the torque output from the engine 2 is kept at the target torque. Because the ignition system 6, which is the sub-actuator, can make the torque respond to its operation promptly, a torque increase induced by the enlargement of the throttle opening angle is canceled out surely.

Figure 3A:
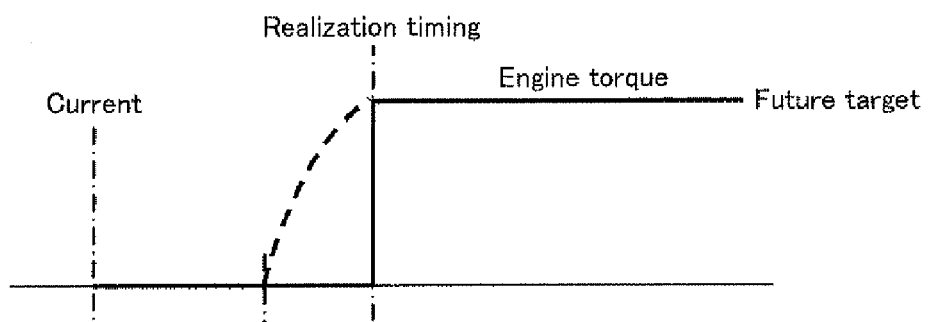
FIGS. 3A to 3C are time charts to show illustrative cases of each control pattern of a throttle opening angle and ignition timing compared to the future torque change.
Figure 3B:
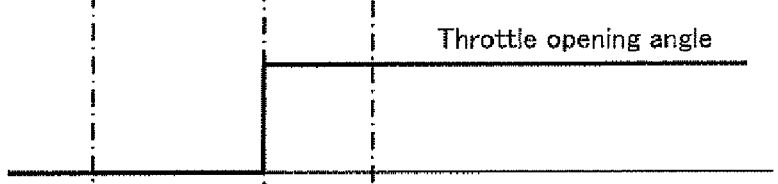
Figure 3C:
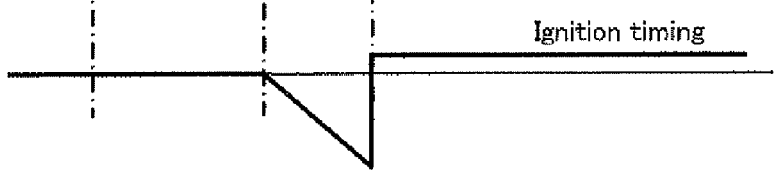

The engine controller 10 receives the future information supplied from the power train manager 12 as the reservation information, setting a control schedule of the engine 2 in accordance with its content. FIG. 3A to 3C are charts showing an example of that. Time chart 3A is a chart showing a future torque change with reference to the current time. Described below is a processing performed when a regulation for increasing torque is reserved to the engine by the power train manager 12.

For the purpose of changing the torque as shown in time chart 3A by controlling the engine 2, several operation patterns can be adopted to each actuator 4, 6. However, when the fuel consumption is considered, the preferred operation pattern is restricted to a certain pattern. The certain pattern is an operation pattern by which the interposition of the ignition system 6, which is the sub-actuator, can be held as low as possible. More specifically, the pattern is an operation pattern by which the period during which the ignition timing is retarded can be shortened as much as possible. If the throttle 4 and ignition system 6 can be made to collaborate in such an operation pattern adequately, a desired torque will be realized while the fuel consumption characteristic is kept at a high level.

Time chart 3B is a chart showing the operation pattern of the throttle 4 to change the torque as shown in time chart 3A. Time chart 3C is a chart showing the operation pattern of the ignition system 6 to change the torque as shown in time chart 3A. A concrete explanation of each time chart follows. The torque change shown by the broken line in time chart 3A is a torque change estimated under a situation in which the throttle opening angle is enlarged at the timing shown in time chart 3B with the ignition timing set at the MBT. The throttle opening angle before enlarged is an opening angle corresponding to a target torque at the current time, and the throttle opening angle after enlarged is an opening angle corresponding to a future target torque (hereinafter referred to as the future target of torque). Note that, here, the throttle opening angle is enlarged in a shape of step, but the throttle opening angle is allowed to be enlarged to the maximum opening angle once, or overshoot once, and then returned to the angle corresponding to the future target.

The difference between the estimated torque shown by the broken line in time chart 3A and the target torque shown by the continuous line in the chart can be canceled by retarding the ignition timing with respect to the MBT. Specifically, as shown in time chart 3C, the ignition timing is retarded at the same time when the throttle 4 opens, being advanced to the MBT again at the reserved realization timing of the future target. An unnecessary torque change before the reserved realization timing is suppressed by retarding the ignition timing as described above. Note that, in time chart 3C, the ignition timings of before being retarded and after being returned again, i.e., the MBTs are different. This is because the MBT changes in accordance with the target torque.

When the throttle opening angle is enlarged at the timing shown in time chart 3B, the torque can reach the future target at desired timing as shown by the broken line in time chart 3A. If the throttle opening angle is enlarged at later timing than the timing shown in time chart 3B, the torque can not reach the future target at the desired timing. On the other hand, if the throttle opening angle is enlarged at earlier timing than the timing shown in time chart 3B, the period during which the ignition timing is retarded becomes unnecessarily long, which causes the deterioration of the fuel consumption. Thus, it is important to compute accurately the timing shown in time chart 3B to realize surely the reserved future target while keeping the fuel consumption characteristic at a high level.

In the present embodiment, the timing when the throttle opening angle is enlarged, which is the timing shown in time chart 3B, depends on the output timing of the target efficiency. According to the configuration of the above-mentioned engine controller 10, the throttle 4 is opened at the timing when the target efficiency computing unit 104 outputs the computed target efficiency. Also, the throttle opening angle and ignition timing retard quantity are determined according to the set value of the target efficiency. Hereinafter, the computation of the target efficiency and its output timing, which is the important part of the present embodiment, will be described with reference to FIGS. 4 to 8.

Figure 4:
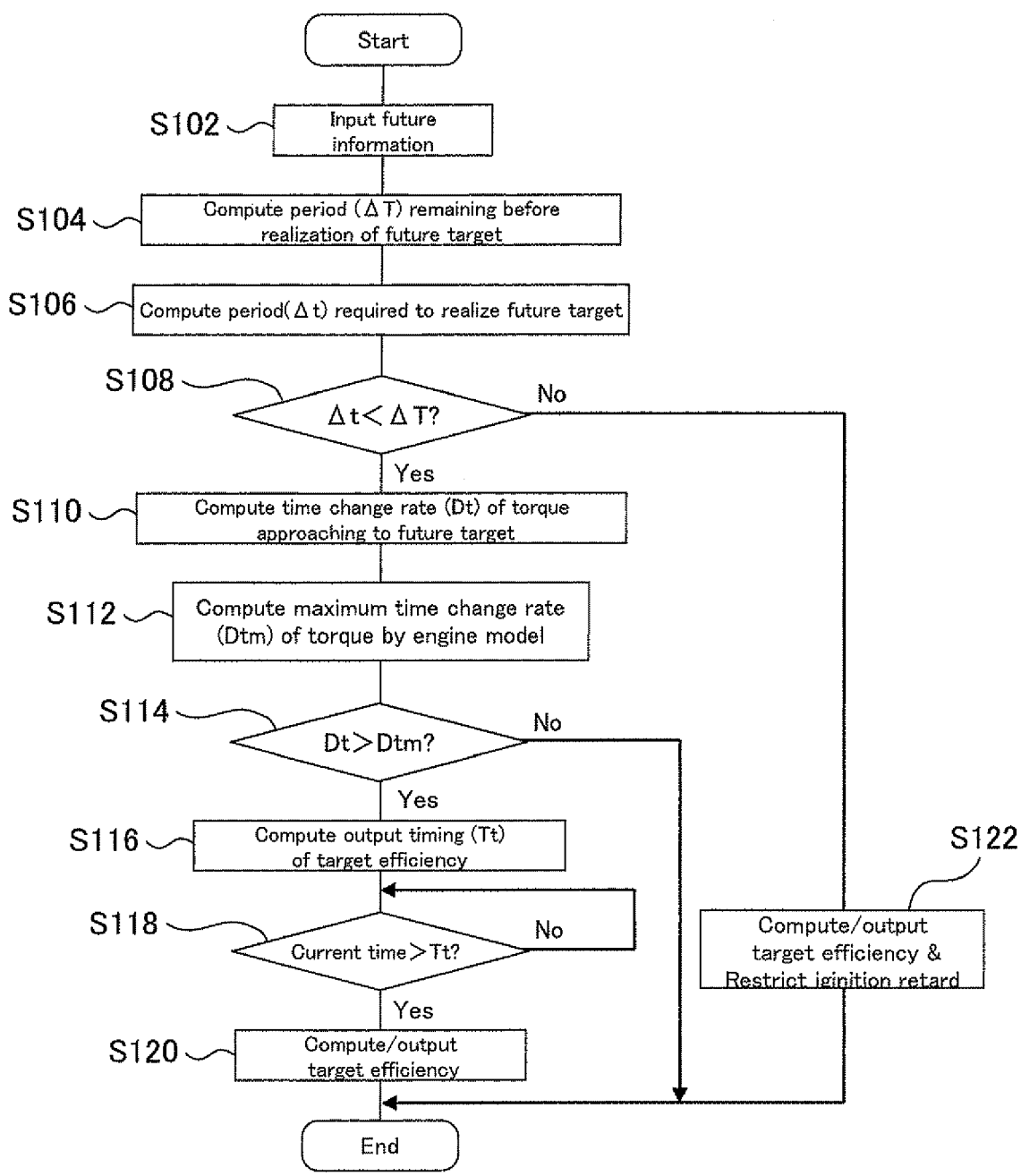
FIG. 4 is a flowchart showing a series of processing performed by the control device of the first embodiment of the present invention.

A series of processing performed by the target efficiency computing unit 104 is shown by use of a flowchart of FIG. 4. As shown in the flowchart of FIG. 4, in the first step S102, the future information is input into the target efficiency computing unit 104. The future information is input in a form of future torque values set at predetermined time intervals with reference to the current time. An example of the future information is shown by use of a time chart of FIG. 5. As shown in FIG. 5, from the future information can be read out a future target of torque, a torque deviation ($\Delta Trq$) of the future target with respect to the current target torque, a start timing (Ts) of the torque regulation for the future target torque, a time rate (Dt) of torque change to the future target, and a realization timing (Te) of the future target that is a regulation completion timing. In next step S104, the period from the current time to the torque realization timing (Te) is computed as a period ($\Delta T$) remaining before the realization of the future target.

In next step S106, computed is the period required to realize the future target under a case in which the torque of the engine 2 is regulated by actuating the throttle 4, which is the main-actuator. An engine model installed in the target efficiency computing unit 104 is used for the computation of this required period. The engine model is implemented by modeling functions of the engine 2 while using various parameters and various computing equations. When operating parameters of the engine 2 such as a throttle opening angle, an ignition timing, an engine speed, and a valve timing are input to the engine model, the torque corresponding to those input parameters is computed and output.

Time charts shown in FIGS. 6A and 6B show an example of a torque result computed by the engine model. In this computation, the ignition timing is set at the MBT, and actual values are used for other operating parameters such as an engine speed and a valve timing. Time chart 6A shows a throttle opening angle change, and time chart 6B shows a corresponding torque change. In step S106, a period ($\Delta t$) from a time when the throttle opening angle is enlarged to a time when an increased amount of torque reaches $\Delta Trq$ is computed as a required period.

In next step S108, the remaining period ($\Delta T$) computed in step S104 is compared with the required period ($\Delta t$) computed in step S106. When the remaining period ($\Delta T$) is enough for the required period ($\Delta t$), the torque can reach the future target at desired timing by the throttle opening angle enlarged in advance. In a case where the remaining period ($\Delta T$) is judged to be enough for the required period ($\Delta t$) as a result of comparison of step S108, the processing after step S110 is performed.

On the other hand, when the remaining period ($\Delta T$) is not enough for the required period ($\Delta t$), the torque can not reach the future target at desired timing even if the throttle opening angle is enlarged in advance. Thus when, as a result of comparing of step S108, the remaining period ($\Delta T$) is judged to be not enough for the required period ($\Delta t$), the processing of step S122 described below is performed.

In step S110, a time change rate (Dt) of the torque approaching to the future target is computed based on the future information input in step S102 (cf. FIG. 5). Also, in step S112, the maximum time change rate (Dtm) generated before the increased amount of torque reaches $\Delta Trq$ is computed by using a result computed by the above-mentioned engine model (cf. FIGS. 6A and 6B). The maximum time change rate (Dtm) is the maximum of time change rate of torque that can be realized only by operating the throttle 4. Therefore, if further time change rate is required, it is necessary to regulate the torque while using other actuator together.

In next step S114, the time change rate (Dt) of the future torque computed in step S110 is compared with the maximum time change rate (Dtm) computed in step s112. When the time change rate (Dt) of the future torque is smaller than the maximum time change rate (Dtm) that can be realized with the throttle 4, the throttle 4 does not had to be opened in advance. In this case, it is enough to enlarge the throttle opening angle in response to the torque rising as well as usual.

When the time rate (Dt) is judged to be smaller than the maximum time rate (Dtm) as a result of the determination in step S114, the following step is skipped so that this routine is ended. Therefore, the target efficiency is not updated in the target efficiency computing unit 104, and the target efficiency to be output is kept at 1 that is the normal value. When the target efficiency is 1, the target torque is not inflated in the target torque correcting unit 10. In addition, when the target efficiency is 1, the torque efficiency that is output from the torque efficiency computing unit 110 also becomes 1. Therefore, the retard quantity computed in the ignition timing computing unit 114 becomes zero, and the conclusive ignition timing is kept at the MBT. Thus, when "No" is selected as the determination result of step S114, the torque regulation is performed in accordance with the target torque only by use of the throttle 4.

In contrast, when the time change rate (Dt) of the future torque is bigger than the maximum time change rate (Dtm) that can be realized with the throttle 4, the processing of step S116, 118 and 120 is performed. At first, in step S116, a timing preceding the torque realization timing (Te) by the required period ($\Delta T$) is computed as an output timing (Tt) of the target efficiency. To explain repeatedly, according to the configuration of the engine controller 10 of the present embodiment, the output timing (Tt) of the target efficiency is the timing to enlarge the throttle opening angle. When the output timing (Tt) of the target efficiency precedes the realization timing (Te), it is possible to open the throttle 4 in advance of the torque rising. Further, when the advance period, by which the output timing (Tt) precedes the realization timing (Te), is set so as to correspond with the required period ($\Delta t$), it becomes possible to make the torque reach the future target at desired timing.

In step S118, it is determined whether the current time has reached the output timing (Tt) of the target efficiency. This determination processing is performed over again until the current time reaches the output timing (Tt) of the target efficiency. And the processing of step S120 is performed when the output timing (Tt) of the target efficiency has come.

In step S120, the target efficiency is computed, and the computed target efficiency is output to the target torque correcting unit 108. In this unit, a ratio of the current target torque to the future target torque is computed as the target efficiency. FIGS. 7A to 7D are time chart showing a control result obtained in a case where the processing of steps S116 to S120 is selected. In time chart 7A, a reserved future target of torque is shown with a target torque computed in the target torque computing unit 102. Time chart 7B shows a computed result of the target efficiency. Before the output timing (Tt) of the target efficiency, the target efficiency is set to 1 that is the normal value. After the output timing (Tt) of the target efficiency, a ratio of the target torque to the future target is set as the target efficiency. Therefore, until the target torque matches the future target, the target efficiency is set to a value smaller than 1.

Time chart 7C shows a result of the target opening angle computed by the throttle opening angle computing unit 112. When a ratio of the target torque to the future target is output as the target efficiency, the value of the corrected target torque computed in the target torque correcting unit 108 matches the future target. As a result, the target opening angle of the throttle 4 is enlarged to the opening angle according to the future target at the output timing (Tt) of the target efficiency.

Also, time chart 7D shows a result of the conclusive ignition timing computed by the ignition timing computing unit 114. As a result that the throttle 4 opens up as shown in time chart 7C, the intake air amount increases rapidly, which causes an increase of the estimated torque computed in the estimated torque computing unit 106. Because the torque efficiency, which is the basis for the computation of the ignition retard quantity, is a ratio of the target torque to the estimated torque, the torque efficiency decreases in response to an increase of the intake air amount, and the ignition timing is retarded with a decrease of the torque efficiency. The timing (Tt), at which the target opening angle of the throttle 4 is enlarged, corresponds to the start timing to retard the ignition timing. Then, when the target torque is increased and the difference between the target torque and the future target turns toward reduction, the ignition timing becomes returned to the advance side and is just returned to the MBT at the timing (Te) at which the target torque matches the future target.

Next is explained the processing performed when the remaining period (ΔT) is smaller than the required period (Δt) as a result of the determination of step S108. In this case, the processing of step S122 is performed in substitution for the processing of steps S110 to S120.

In step S122, a ratio of the current target torque to the future target is computed as the target efficiency, and the computed target efficiency is output to the target torque correcting unit 108. In other words, the target efficiency is output immediately without weighing the output timing (Tt). FIGS. 8A to 8D are time charts showing a control result obtained in a case where the processing of step S122 is selected. In time chart 8A, a reserved future target of torque is shown with a target torque computed in the target torque computing unit 102 and an actual engine torque generated when the throttle 4 and the ignition system 6 are controlled as described below. A computed result of the target efficiency is shown in time chart 8B.

When the target efficiency is output, the throttle opening angle is enlarged immediately up to an opening angle that is appropriate for the future target. Time chart 8C shows a result of the target opening angle computed by the throttle opening angle computing unit 112.

As a result that the throttle 4 is opened, the torque efficiency decreases with an increase of the intake air amount. The ignition retard quantity is computed on the basis of the torque efficiency in the ignition timing computing unit 114. However, when the processing of step S122 is selected, the ignition retard quantity is limited by a guard. More specifically, the ignition retard quantity is set to zero independently of the value of the torque efficiency. Time chart 8D shows a result of the conclusive ignition timing computed by the ignition timing computing unit 114. When, as shown in this chart, the remaining period (ΔT) is not enough for the required period (Δt), the ignition timing is kept at the MBT that is appropriate for the target torque without being retarded.

As mentioned above, the control device of the present embodiment has various characteristic features within the configuration and control manner of the engine controller 10. In the following, the characteristic operations of the engine controller 10 are explained together with the effects achieved by those operations.

Receiving a reservation of the engine torque regulation in the form of the future information from the power train manager 12, the engine controller 10 reads out the future target of torque from the future information and computes from the operating condition of the engine 2 the period (Δt) required to realize the future target. Further, the engine controller 10, at the timing (Tt) preceding the reserved realization timing (Te) by the required period (Δt), starts the operation of the throttle 4, which is the main-actuator, toward the realization of the future target. Such advancing operation of the throttle 4 makes it possible to realize accurately the reserved future target of torque just at the reserved realization timing (Te).

At the same time as opening up the throttle 4, the engine controller 10 operates the ignition system 6, which is the sub-actuator, to cancel the torque change induced by that the throttle opening angle is enlarged during the period from the time when the throttle opening angle is enlarged to the reserved realization timing (Te). When the ignition timing is retarded by the ignition system 6, it becomes possible to suppress an unnecessary torque change before the reserved realization timing (Te). Further, the required period (Δt) is neither too short nor too long to realize the future target at the reserved realization timing (Te). Because the ignition system 6 is operated to retard the ignition timing within the required period (Δt), it is possible to minimize the period during which the ignition timing is retarded.

When the time change rate (Dt) of the future torque is smaller than the maximum time change rate (Dtm) that can be realized with the throttle 4, the engine controller 10 regulates the torque only by operating of the throttle 4. And, when it is impossible to achieve the time change rate (Dt) only by operating the throttle 4, the engine controller 10 regulates the torque by also retarding the ignition timing together. Thus, by performing the collaboration control of the throttle 4 and ignition system 6 on the basis of the time rate (Dt) of the future torque, it becomes possible to increase the torque with the desired time change rate (Dt) while holding the retard of the ignition timing to the minimum necessary.

When the remaining period (ΔT) before the realization of the future target is not enough for the required period (Δt), the engine controller 10 makes the throttle opening angle enlarge immediately to increase the torque, while prohibiting the retard of the ignition timing. In such a situation in which the remaining period (ΔT) is short, the retard of the ignition timing can not be very effective in suppressing the torque change. Consequently, by performing the ignition timing retard on condition that the remaining period (ΔT) is enough for the required period (Δt), useless retard of the ignition timing is prevented.

Note that, in the present embodiment, the power train manager 12 is equivalent to the "vehicle control means" of the first aspect of the present invention. The engine controller 10 is equivalent to the "reservation information taking means" of the first aspect of the present invention. The target efficiency computing unit 104 is equivalent to the "required period computing means" of the first aspect of the present invention. The target efficiency computing unit 104, target torque correcting unit 108, throttle opening angle computing unit 112 and throttle driver 116 constitute the "main-actuator control means" of the first aspect of the present invention. The target efficiency computing unit 104, torque efficiency computing unit 110, ignition timing computing unit 114 and ignition driver 118 constitute the "sub-actuator control means" of the first aspect of the present invention.

Second Embodiment

The control device according to the second embodiment of the present invention differs from the control device according to the first embodiment in the content of the future information (the reservation information) supplied from the power train manager 12 to the engine controller 10. The configuration of the control device is common to the first embodiment and the present embodiment. The overall configuration is shown in FIG. 1. The detailed configuration of the engine controller 10 is shown in FIG. 2.

Figure 9:
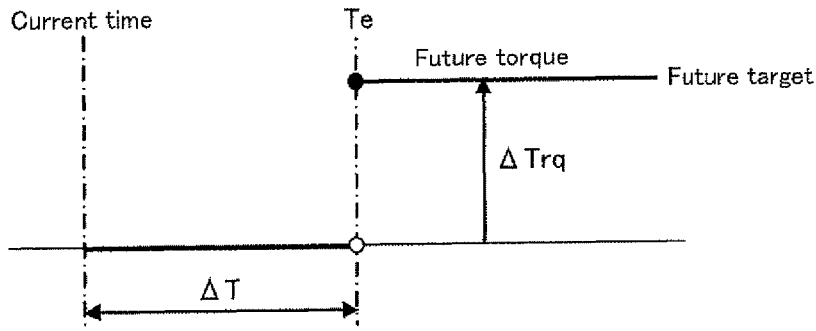
FIG. 9 is a time chart to show the format of the future information used in a second embodiment of the present invention.

In the present embodiment, only a future target value and its realization timing are supplied to the engine controller 10 as the future information. An example of the future information is shown by the use of a time chart of FIG. 9. As shown in FIG. 9, all things that can be read out from the future information are only the future target of torque and its realization timing (Te), that is the regulation completion timing. The start timing of the torque regulation and the time change rate of torque that is approaching to the future target are not included in the future information. The future information is used for computing the target efficiency in the target efficiency computing unit 104. Because of this, the present embodiment is further different from the first embodiment in the content of the processing conducted in the target efficiency computing unit 104.

Figure 10:
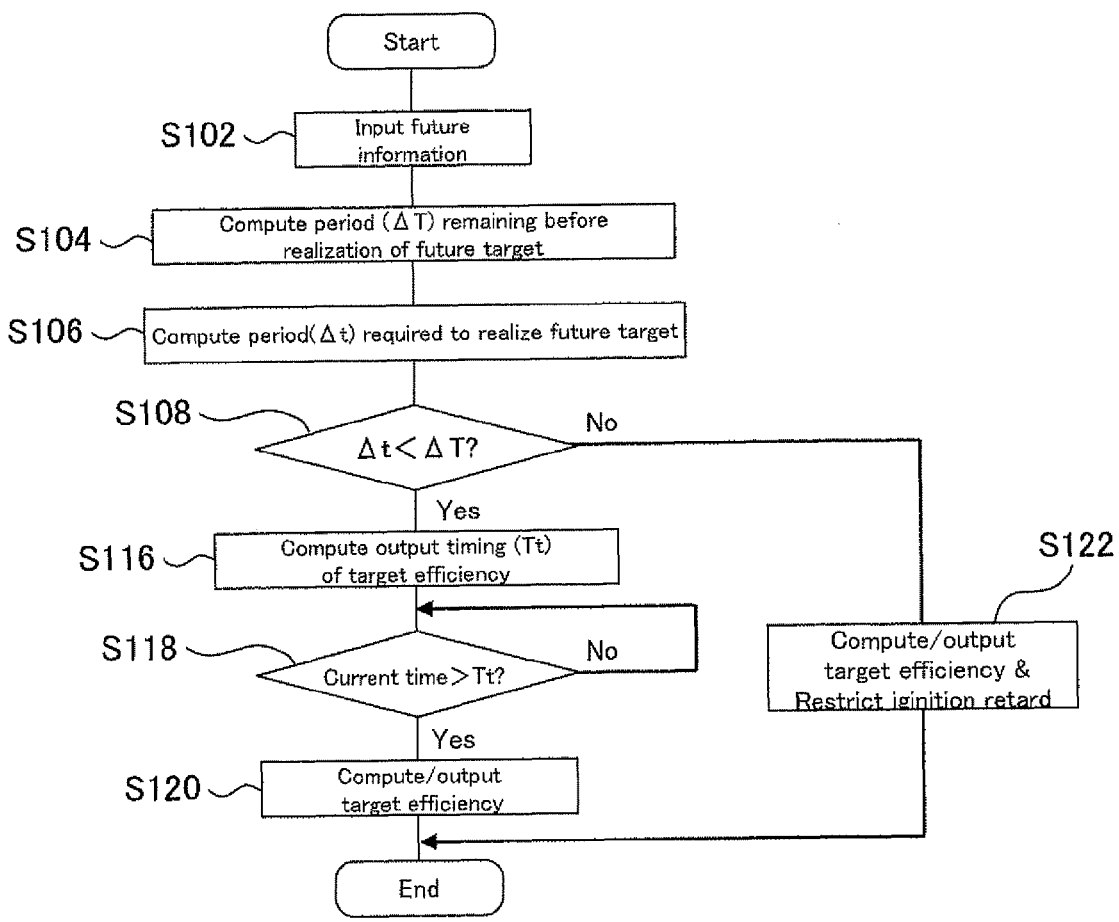
FIG. 10 is a flowchart showing a series of processing performed by the control device of the second embodiment of the present invention.

FIG. 10 is a flowchart showing a series of processing conducted in the target efficiency computing unit 104 of the present embodiment. In this flowchart, the same step number as for the flowchart shown in FIG. 4 means that the content of processing is common to both processing steps assigned the said number. The processing conducted in the target efficiency computing unit 104 is described along the flowchart as follows.

In the first step S102, future information is input into the target efficiency computing unit 104. The format of the future information is just what shown in the time chart of FIG. 9. In next step S104, the period from the current time to the torque realization timing (Te) is computed as a period ($\Delta T$) remaining before the realization of the future target. Further, in step S106, a period required to realize the future target under a case in which the torque of the engine 2 is regulated by the operation of the throttle 4 is computed while using the engine model.

In next step S108, the remaining period ($\Delta T$) computed in step S104 is compared with the required period ($\Delta t$) computed in step S106. When the remaining period ($\Delta T$) is not enough for the required period ($\Delta t$), the processing of step S122 is performed. In fact, the target efficiency is output immediately without weighing the output timing, and the throttle opening angle is enlarged immediately to the opening angle that is appropriate to the future target. Meanwhile, the ignition timing is kept at the MBT which is appropriate for the target torque without being retarded.

On the other hand, when the remaining period ($\Delta T$) is enough for the required period ($\Delta t$), the processing of step S116 is performed. The processing flow of the target efficiency computing unit 104 in the present embodiment is equivalent to what is derived by removing processing steps of step S110, S112 and S114 from the processing flow of the target efficiency computing unit 104 in the first embodiment. Because, as shown in the time chart of FIG. 9, the time change rate of torque which is approaching the future target is not included in the future information used in the present embodiment, processing steps of step S110, S112 and S114 are no use.

In step S116, the timing preceding the future target realization timing (Te) by the required period ($\Delta T$) is computed as the output timing (Tt) of the target efficiency. In next step S118, it is determined whether the current time has reached the output timing (Tt) of the target efficiency. Then, the processing of step S120 is performed when the output timing (Tt) of the target efficiency has come.

In step S120, a ratio of the current target torque to the future target torque is computed as the target efficiency, and the computed value is output to the target torque correcting unit 108. As a result, the throttle opening angle is enlarged to the opening angle that is appropriate for the future target. The ignition timing is retarded at the same time as the throttle opening angle is enlarged, and then it is returned to the MBT at the future target realization timing (Te).

As discussed above, the future information used in the present embodiment has less information content than the future information used in the first embodiment. However, if at least the future target and its realization timing are included in the future information, like the first embodiment, it is possible to realize accurately the reserved future torque (future target) just at the reserved realization timing (Te) while minimizing the period during which the ignition timing is retarded.

Third Embodiment

Figure 11:
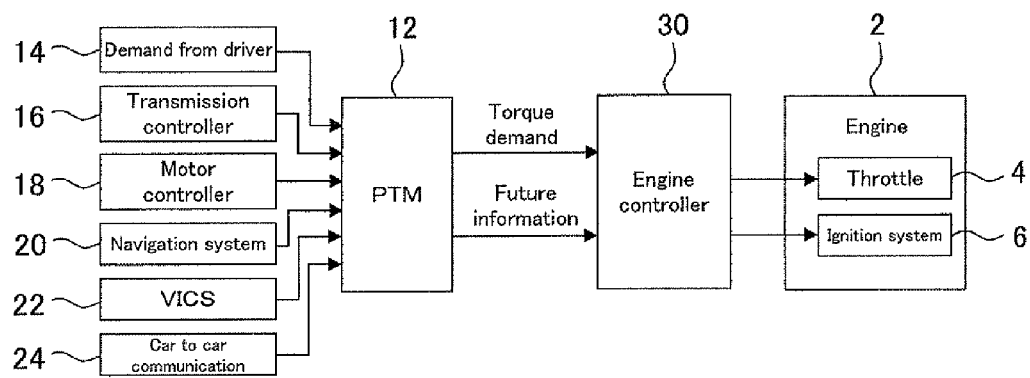
FIG. 11 is a block diagram illustrating the configuration of a control device for a vehicle drive unit as a third embodiment of the present invention.

FIG. 11 is a block diagram illustrating the configuration of a control device for a vehicle drive unit as the third embodiment of the present invention. Elements that are shown in FIG. 11 and identical with those of the control device according to the first embodiment are assigned the same reference numerals as their counterparts. The control device according to the present embodiment is different from the control device according to the first embodiment only in the configuration of the engine controller 30. Other elements of the control device according to the present embodiment are identical with those of the first embodiment.

The engine controller 30 is supplied with a torque demand and future information from the power train manager 12 which is superior to it. The supply of the future information means a reservation of the torque regulation in the engine 2 made by the power train manager 12. The future information received by the engine controller 30 is treated as a reservation information. The control schedule of the engine 2 will be made in accordance with the content of the reservation information. Note that the future information used in the present embodiment shall include information as shown in the time chart of FIG. 5. More concretely, the future target of torque, the torque deviation ($\Delta Trq$) of the future target to the current target torque, the start timing (Ts) of the torque regulation for the future target torque, the time change rate (Dt) of torque which is approaching the future target, and the realization timing (Te) of the future target are included as the information.

Figure 12:
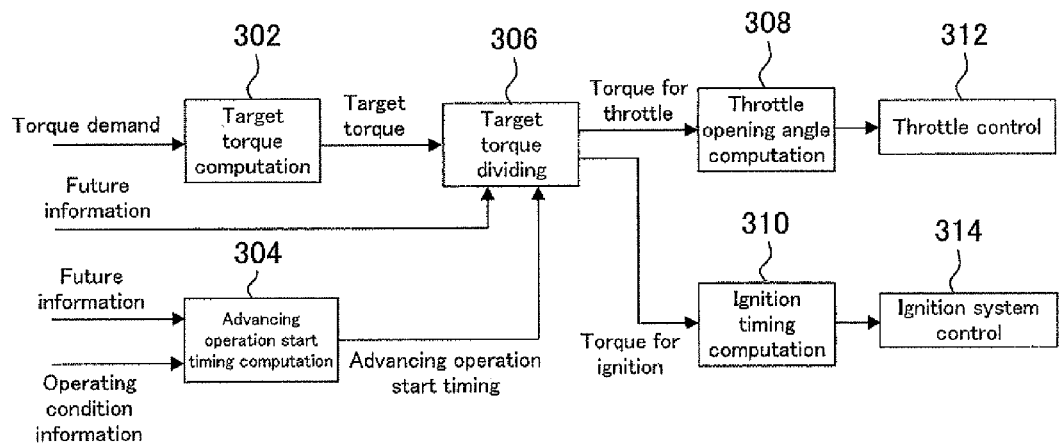
FIG. 12 is a block diagram illustrating the configuration of an engine controller according to the third embodiment of the present invention.

FIG. 12 is a block diagram illustrating the configuration of the engine controller 30. As shown in this figure, the engine controller 30 comprises a plurality of computing elements 302, 304, 306, 308, 310. Also, the engine controller 30 comprises a throttle driver 312 controlling the operation of the throttle and an ignition driver 314 controlling the operation of the ignition system. Input into the engine controller 30 are the information concerning the operating condition of the engine 2 as well as the torque demand and the future information supplied from the power train manager 12. The information concerning the operating condition includes engine speed, output value of an air flow meter, true ignition timing at present, circulating water temperature, valve timing and the like.

The torque demand supplied from the power train manager 12 is input to a target torque computing unit 302. The target torque computing unit 302 computes the target torque of the engine 2 on the basis of the input torque demand. For computing the target torque, processing such that adding vibration control torque to a demanded torque value and the like are performed. The computed target torque is output to a target torque dividing unit 306 described below.

The future information supplied from the power train manager 12 is input to a timing computing unit 304 with the operating condition information. The throttle 4 and the ignition system 6 start their operation in advance to the realization timing of the future target. The timing computing unit 304 computes the timing for starting the operation on the basis of the input future information. The computed advancing operation start timing is output to the target torque dividing unit 306 described below.

The target torque dividing unit 306 divides the target torque supplied from the torque computing unit 302 into the torque that should be realized by the throttle 4 (hereinafter referred to as the torque for throttle) and the torque that should be realized by the ignition system 6 (hereinafter referred to as the torque for ignition). The torque for throttle of divided torque is output to a throttle opening angle computing unit 308. The torque for ignition is output to an ignition timing computing unit 310.

The target torque dividing unit 306 is supplied with the advancing operation start timing and the future information along with the target torque. Before the arrival of the advancing operation start timing, that is, under a normal situation, the target torque dividing unit 306 uses the target torque as it is as the torque for throttle while setting the torque for ignition to zero. After the arrival of the advancing operation start timing, the future target included in the future information is used as the torque for throttle, and a minus torque that is the difference between the target torque and the future target is computed as the torque for ignition. And then, after the arrival of the future target realization timing, the target torque is used as it is as the torque for throttle, and the torque for ignition is set to zero again.

The throttle opening angle computing unit 308 converts the torque for throttle supplied from the target torque dividing unit 306 into an air amount so as to compute the opening angle of the throttle 4 to realize the air amount. The opening angle computed by the throttle opening angle computing unit 308 is set to a throttle driver 312 as a target opening angle of the throttle 4. The throttle driver 312 controls the throttle 4 to realize the opening angle.

The ignition timing computing unit 310, at first, computes a retard quantity with respect to the MBT based on the torque for ignition supplied from the target torque dividing unit 306. A map having at least an axis of torque is used for computing the retard quantity. According to this computation, the larger the absolute value of torque, the larger the retard quantity is set. Then, the conclusive ignition timing is computed from the retard quantity computed from the torque for ignition and the base ignition timing depending on the operating condition of the engine 2. The computed conclusive ignition timing is set to the ignition driver 314 from the ignition timing computing unit 310. The ignition driver 314 controls the ignition system 6 according to the conclusive ignition timing.

According to the above described configuration of the engine controller 30, it is possible to operate the throttle 4 and the ignition system 6, like the first embodiment, in such an operation pattern as shown in time charts 3A to 3C. Following is a detailed description of the computation performed by the engine controller 30 when the future information is supplied from the power train manager 12 thereto.

Figure 13:
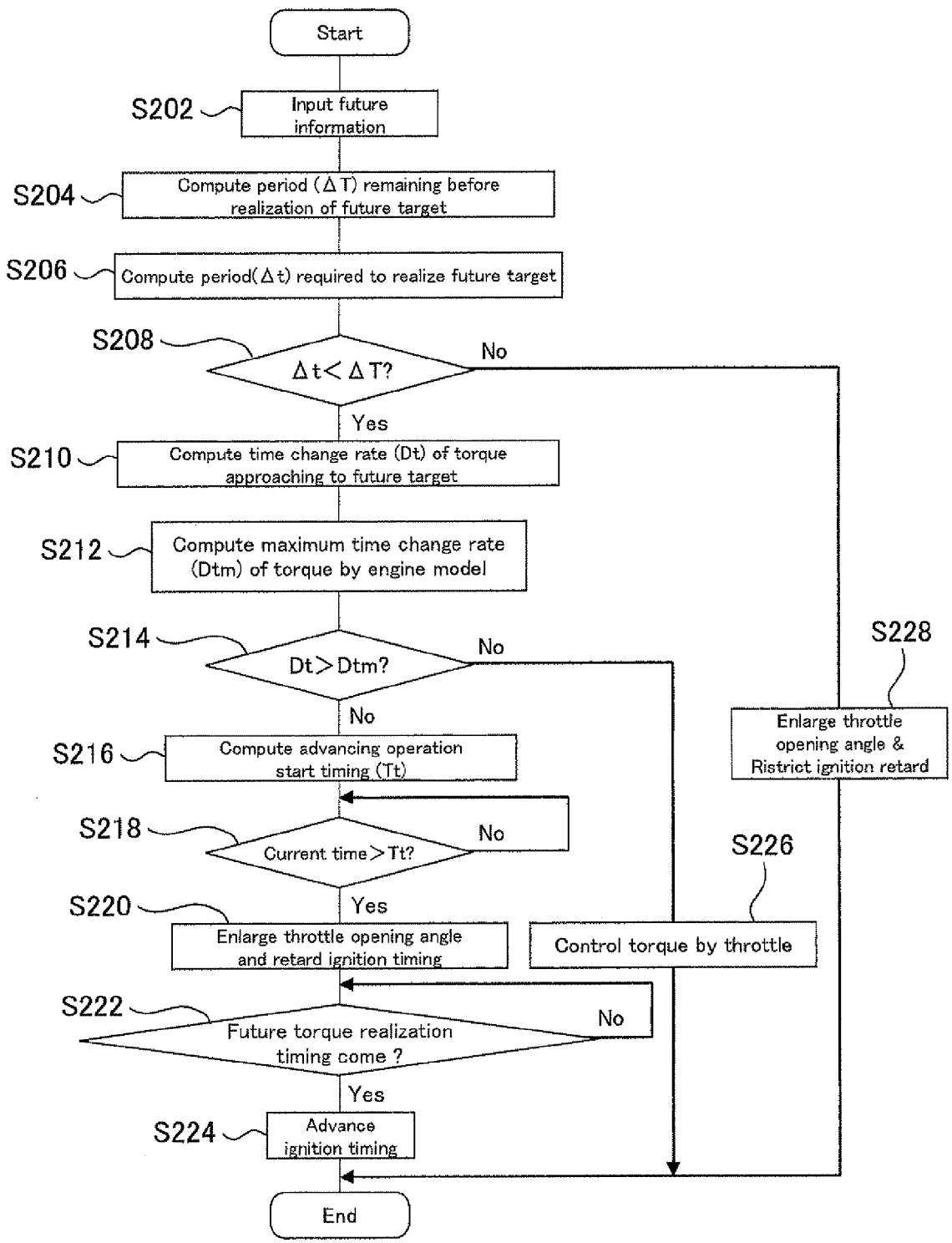
FIG. 13 is a flowchart showing a series of processing performed by the control device of the second embodiment of the present invention.

FIG. 13 is a flowchart showing a series of processing performed by the engine controller 30. As shown in the flowchart of FIG. 13, the future information is input into the timing computing unit 304 and target torque dividing unit 306 in first step S202. The format of the future information is just what it is shown in the time chart of FIG. 5.

The processing of next steps S204 to S216 is performed by the timing computing unit 304. At first, in step S204, the period from the current time to the torque realization timing (Te) is computed as the period ($\Delta T$) remaining before the realization of the future target. Also in step S206, the period required to realize the future target under a situation in which the torque of the engine 2 is regulated by operating the throttle 4 is computed by use of the engine model. A detailed description of the procedure for computing the remaining period ($\Delta T$) is omitted because it is similar to that of the first embodiment.

In next step S208, the remaining period ($\Delta T$) computed in step S204 is compared with the required period ($\Delta t$) computed in step S206. When the remaining period ($\Delta T$) is enough for the required period ($\Delta t$), the processing of and after step S210 is performed. On the other hand, when the remaining period ($\Delta T$) is not enough for the required period ($\Delta t$), the processing of step S228 described below is performed.

In step S210, the time change rate (Dt) of torque approaching to the future target is computed based on the future information input in step S202. Also, in step S212, the maximum time change rate (Dtm) arising before the increased amount of torque reaches $\Delta Trq$ is computed while using the result computed by the above-mentioned engine model.

In next step S214, the time change rate (Dt) of the future torque computed in step S210 is compared with the maximum time change rate (Dtm) computed in step S212. When the time change rate (Dt) of the future torque is bigger than the maximum time change rate (Dtm) that can be realized with the throttle 4, the processing of next step S216 is performed. On the other hand, when the time change rate (Dt) of the future torque is smaller than the maximum time change rate (Dtm) that can be realized with the throttle 4, the processing of step S226 described below is performed.

In step S216, the timing preceding the future torque realization timing (Te) by the required period ($\Delta T$) is computed as the advancing operation start timing (Tt). The computed advancing operation start timing is output to the target torque dividing unit 306.

The processing of next steps S218 to S224 is performed by the target torque dividing unit 306. In step S218, it is determined whether the current time has reached the advancing operation start timing (Tt). This determination processing is performed over again until the current time has reached the advancing operation start timing (Tt). And the processing of step S220 is performed when the advancing operation start timing (Tt) has come.

In step S220, the torque for throttle is changed from the target torque to the future target included in the future information. At the same time, the torque for ignition is changed from the normal value of zero to a minus torque that is the difference between the target torque and the future target. Upon this change, the target opening angle of the throttle 4, which is computed by the throttle opening angle computing unit 308, is enlarged to an opening angle appropriate for the future target. And the conclusive ignition timing, which is computed by the ignition timing computing unit 310, is retarded more than the MBT.

In next step S222, it is determined whether the current time has reached the future torque realization timing (Te). This determination processing is performed over again until the current time has reached the future torque realization timing (Te). And the processing of step S224 is performed when the future torque realization timing (Te) has come.

In step S224, the torque for throttle is changed again from the future target to the target torque. At the same time, the torque for ignition is changed again to the normal value of zero. At this point of time, the target torque is consistent with the future target. Accordingly, the target opening angle of the throttle 4, which is computed by the throttle opening angle computing unit 308, is kept at the current opening angle. The conclusive ignition timing, which is computed by the ignition timing computing unit 310, is advanced to the MBT.

According to the processing of steps S220 to S224, the advancing operation of the throttle 4 is conducted, which makes it possible to realize accurately the reserved future target of torque just at the reserved future torque realization timing (Te). Further, during the period from the time when the throttle opening angle is enlarged to the future torque realization timing (Te), the ignition timing is retarded to cancel the torque change induced by that the throttle opening angle is enlarged. This makes it possible to suppress an unnecessary torque change before the future torque realization timing (Te). In addition, the required period ($\Delta t$) is neither too short nor too long to realize the future target at the future torque realization timing (Te). Because the ignition system 6 is operated to retard the ignition timing within the required period (Δt), it is possible to minimize the period during which the ignition timing is retarded.

Next is explained the processing performed when the time change rate (Dt) of the future torque is smaller than the maximum time change rate (Dtm) that can be realized with the throttle 4. In this case, the processing of step S226 is performed in substitution for the processing of steps S216 to S224.

The processing of step S226 is performed by the target torque dividing unit 306. In step S226, the torque for throttle is kept at the target torque, and the torque for ignition is kept at the normal value of zero without being changed. By this, the target opening angle of the throttle 4 changes according to the target torque while the conclusive ignition timing is kept at the MBT. Thus, in this case, the torque is regulated based on the target torque only by using the throttle 4. By performing the collaboration control of the throttle 4 and ignition system 6 on the basis of the time change rate (Dt) of the future torque as mentioned above, it becomes possible to increase the torque with the desired time change rate (Dt) while holding the retard of the ignition timing to the minimum necessary.

Next is explained the processing performed when the remaining period (ΔT) is smaller than the required period (Δt). In this case, the processing of step S228 is performed in substitution for the processing of steps S210 to S224.

The processing of step S228 is performed by the target torque dividing unit 306. In step S228, the torque for throttle is changed from the target torque to the future target included in the future information. Upon this change, the target opening angle of the throttle 4 is enlarged immediately to an opening angle appropriate for the future target. But the torque for ignition is kept at the normal value of zero without being changed. In other words, the ignition timing is kept at the MBT that is appropriate for the target torque without being retarded, whereas the throttle opening angle is enlarged immediately. In such a situation in that the remaining period (ΔT) is short, the retard of the ignition timing can not be very effective in suppressing the torque change. Consequently, useless retard of the ignition timing is prevented by retarding the ignition timing only when a condition of that the remaining period (ΔT) is enough for the required period (Δt) is satisfied.

As discussed above, the engine controller 30 of the present embodiment differs considerably from the engine controller 10 of the first embodiment in the configuration as well as the content of the control. However, its advantageous effect is equal to that of the first embodiment. That is, it is possible to realize accurately the reserved future torque (future target) just at the reserved realization timing (Te) while minimizing the period during which the ignition timing is retarded.

Note that, in the present embodiment, it is assumed that the future information includes the information content as shown in the time chart of FIG. 5, but all of the content need not to be always included. If at least the future target and its realization timing are included in the future information, it is possible to realize surely the reserved future torque just at the reserved realization timing while minimizing the period during which the ignition timing is retarded. Thus, the future information may not include the time change rate of torque approaching to the future target as shown in the time chart of FIG. 9. In this case, the processing of steps S210, S212 and S214 can be omitted from the processing flow shown in FIG. 13.

In the present embodiment, the power train manager 12 is equivalent to the "vehicle control means" of the first aspect of the present invention. The engine controller 30 is equivalent to the "reservation information taking means" of the first aspect of the present invention. The timing computing unit 304 is equivalent to the "required period computing means" of the first aspect of the present invention. The target torque dividing unit 306, throttle opening angle computing unit 308 and throttle driver 316 constitute the "main-actuator control means" of the first aspect of the present invention. The target torque dividing unit 306, ignition timing computing unit 310 and ignition driver 312 constitute the "sub-actuator control means" of the first aspect of the present invention.

Fourth Embodiment

FIG. 14 is a block diagram illustrating the configuration of a control device for a vehicle drive unit as the fourth embodiment of the present invention. Elements that are shown in FIG. 14 and identical with those of the control device according to the first embodiment are assigned the same reference numerals as their counterparts. This control device includes the engine controller 10, of which the configuration is shown in the block diagram of FIG. 2, like with the first embodiment. The configuration of the control device of the present embodiment is explained referring to FIG. 14 and FIG. 2 as follows.

The control device of the present embodiment includes an accessories controller 28 controlling an accessory device 26. The accessories controller 28 is connected to the power train manager 12 together with the engine controller 10. The throttle 4 as a main-actuator and the ignition system 6 as a sub-actuator, which are used for regulating the torque of the engine 2, are connected to the engine controller 10.

The term accessory device 26 in the present embodiment refers to a device driven by the engine 2 like an alternator or an air conditioner compressor. This accessory device 26 works by consuming the torque that the engine 2 outputs. Accordingly, when the driving of the accessory device 26 is started suddenly, part of the torque output by the engine 2 will be consumed unexpectedly by the accessory device 26. This causes a sudden torque drop for the whole vehicle drive unit.

Such a problem can be solved by making the torque of the engine 2 increase in response to the driving start of the accessory device 26. In other words, the output torque of the engine 2 should be increased by the torque necessary for driving the accessory device 26 (hereinafter referred to as the accessory driving torque). But it is difficult for the engine 2 to increase torque suddenly. Accordingly, if it can be known beforehand that the drive of the accessory device 26 will be started, advancing operation of the actuators 4, 6 concerning the torque regulation of the engine 2 should be performed in preparation for the drive of the accessory device 26.

Thus, when the need to drive the accessory device 26 arises, the accessories controller 28, which controls the accessory device 26, requests the power train manager 12 to grant permission to drive the accessory device 26 at first. And then, the accessories controller 28 starts the driving of the accessory device 26 after being granted permission to drive from the power train manager 12.

On the other hand, the power train manager 12 directs the engine controller 10 to start the advancing operation of the actuators 4 and 6 when receiving the request for granting permission to drive from the accessories controller 28. And then, the power train manager 12 permits the accessories controller 28 at an appropriate timing to drive the accessory device 26.

The key in the above-mentioned process is a period from the start of the advancing operation of each actuator 4 and 6 until permission to drive the accessory device 26 is granted.

An explanation on this point is shown referring to time charts of FIG. 15A to 15D as follows.

Time chart 15A shows a change of the accessory driving torque around the time when the drive of the accessory device 26 is started. As shown in this figure, the accessory driving torque steeply rises up in a step-like pattern at the same time as the start of the drive of the accessory device 26. In order to absorb such a change of the accessory driving torque by the engine 2, the torque of engine 2 should be changed so as to accord with the accessory driving torque as shown in time chart 15B.

For the purpose of changing the torque as shown in time chart 15B by controlling the engine 2, several operation patterns can be adopted to each actuator 4, 6. However, when the fuel consumption is considered, the preferred operation pattern is restricted to a certain pattern. The certain pattern is an operation pattern by which the interposition of the ignition system 6 which is the sub-actuator can be held as low as possible. More specifically, the pattern is an operation pattern by which the period during which the ignition timing is retarded can be shortened as much as possible. If the throttle 4 and ignition system 6 can be made to collaborate in such an operation pattern adequately, a desired torque will be realized while the fuel consumption characteristic is kept at a high level.

Time chart 15C shows an operation pattern of the throttle 4 to change the torque as shown in time chart 15B. Time chart 15D shows an operation pattern of the ignition system 6 to change the torque as shown in time chart 15B. A concrete explanation of each time chart follows. The torque change shown by a broken line in time chart 15B is the torque change estimated when the throttle opening angle is enlarged at the timing shown in time chart 15C while the ignition timing is kept at the MBT. The throttle opening angle before enlarged is an opening angle corresponding to a target torque at the current time, whereas the throttle opening angle after enlarged is an opening angle corresponding to a future target torque including the accessory driving torque (hereinafter referred to as the future target of torque). Note that, here, the throttle opening angle is enlarged in the shape of step, but the throttle opening angle may be enlarged to the maximum opening angle once, or overshot once, and then returned to the angle corresponding to the future target.

The difference between the estimated torque shown by the broken line in time chart 15B and the target torque shown by the continuous line in the chart can be canceled by retarding the ignition timing with respect to the MBT. Specifically, as shown in time chart 15D, the ignition timing is retarded at the same time as the throttle 4 opens, being advanced to the MBT again at the start timing of the drive of the accessory device 26. An unnecessary torque change before the start of the drive of the accessory device 26 can be suppressed by retarding the ignition timing as described above. Note that, in time chart 15D, the ignition timings of before being retarded and after being returned again, i.e., the MBTs are different. This is because the MBT changes in accordance with the target torque.

When there is a proper relation between the timing for starting the advancing operation of each actuator 4, 6 and the timing for starting the drive of the accessory device 26, the torque is made to reach the future target at desired timing as shown in time chart 15B. However, if there is not enough time from the start of the advancing operation of each actuator 4, 6 to the start of the drive of the accessory device 26, the torque is not made to increase fully by the time when the desired timing comes. On the other hand, if there is excessive time from the start of the advancing operation of each actuator 4, 6 to the start of the drive of the accessory device 26, the period during which the ignition timing is retarded becomes unnecessarily long, which causes the deterioration of the fuel consumption. Thus, in order to suppress surely the torque change around the start timing of the drive of the accessory device 26 while keeping the fuel consumption characteristic at a high level, it is important to compute accurately the adequate period from the start of the advancing operation of each actuator 4, 6 to the start of the drive of the accessory device 26.

Hereinafter, the computation of the timing for granting permitting to drive the accessory device 26, which is the important part of the present embodiment, will be described with reference to FIGS. 16 to 18. The timing for starting the advancing operation of each actuator 4, 6 can be determined arbitrarily depending on the timing at which the target efficiency is output in the engine controller 10. As described in the first embodiment, according to the configuration of the engine controller 10 shown in FIG. 2, the throttle 4 is made to open and the ignition timing is made to retard at the timing when the target efficiency computing unit 104 outputs the computed target efficiency. Also, the throttle opening angle and ignition timing retard quantity are determined according to the set value of the target efficiency.

Figure 16:
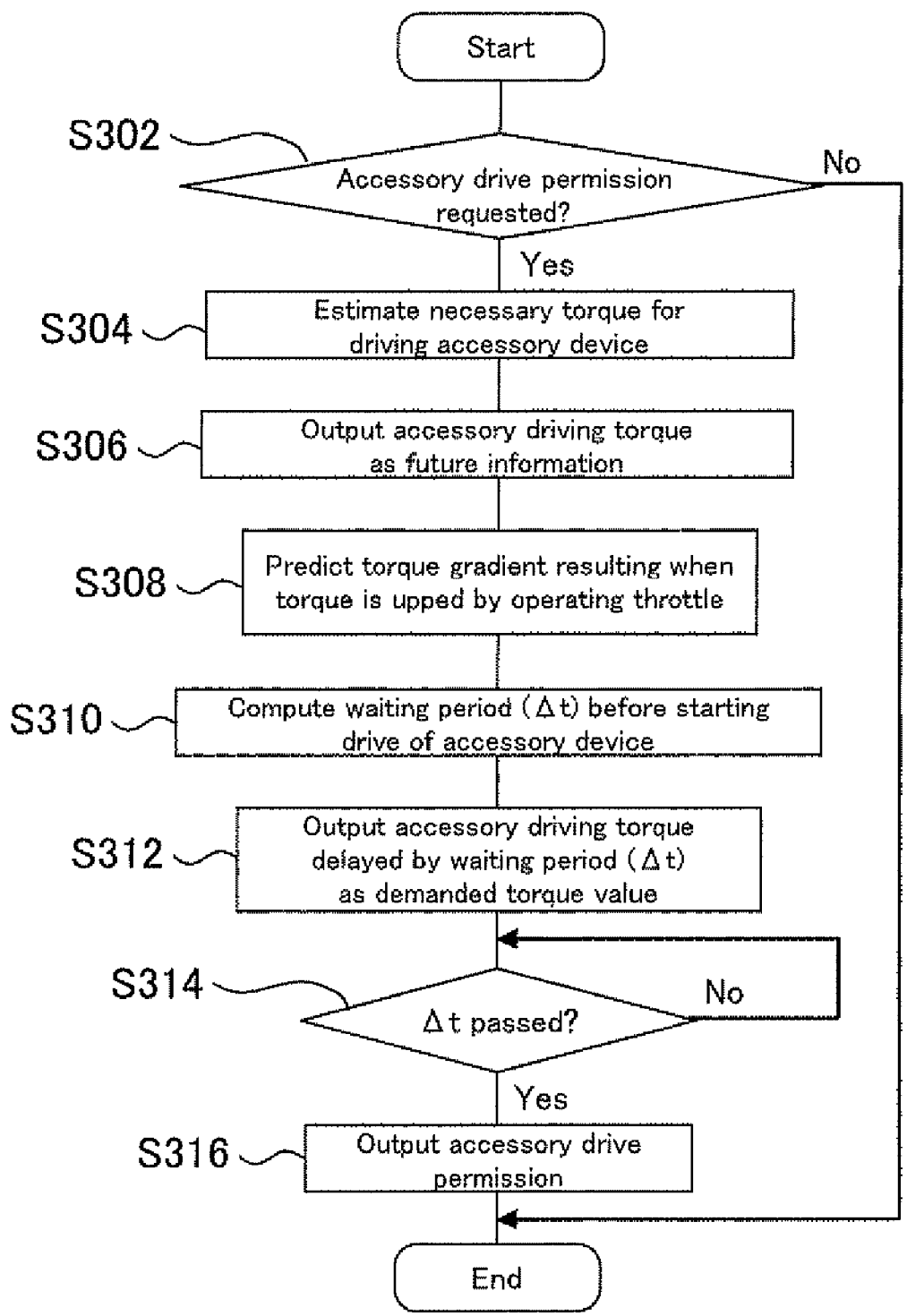
FIG. 16 is a flowchart showing a series of processing performed by the control device of the fourth embodiment of the present invention.

A series of processing performed in the present embodiment is shown by use of a flowchart of FIG. 16. A control result by the flowchart of FIG. 16 is shown by use of time charts of FIGS. 17A to 17G. In the following, the processing by the power train manager 12 is explained along the flowchart of FIG. 16 while referring to time charts 17A to 17G appropriately.

In the first step S302, it is determined whether the request for granting permission to drive the accessory device 26 has been input. A flag of the request for granting permission to drive accessories is shown to the power train manager 12 from the accessories controller 28. As shown in time chart 17A, when this flag turns ON, the request for granting permission to drive is considered to have been input. The processing after next step S304 is performed when the request for granting permission to drive has been input.

In step S304, an estimation of the torque necessary for driving the accessory device 26, that is the accessory driving torque, is performed. The magnitude of the accessory driving torque is computed on the basis of the target operating condition of the accessory device 26 (e.g., the target power generation in case that the accessory device 26 is an alternator).

In next step S306, the accessory driving torque computed in step S304 is output to the engine controller 10 as the future information. The future information including the accessory driving torque output to the engine controller 10 is shown in time chart 17B.

In next step S308, a torque gradient resulting when a torque is upped by operating the throttle 4 as the main-actuator is predicted. The engine model is used for the prediction of the torque change. According to the engine model, the gradient of the torque output from the engine 2 is predicted from the drive condition of the engine 2 such as a throttle opening angle, an ignition timing, an engine speed or a valve timing. The time chart of FIG. 18 shows the torque gradient predicted by the engine model. In this computation, the ignition timing is assumed to be the MBT, but an actual value is used in other drive condition such as the engine speed or the valve timing.

In next step S310, a waiting period (Δt) before starting the drive of the accessory device 26 is computed with the use of the prediction result of step S308. A procedure for computing the waiting period (Δt) is shown in the time chart of FIG. 18. According to the procedure, at first, the required period (Δt2), which is the period from when the throttle opening angle is enlarged until the torque increases by the accessory driving torque, is computed. And also, the delay period (Δt1), which is the period from when the accessories controller 28 is permitted to drive the accessory device 26 until the actual torque necessary for driving the accessory device 26 reaches the estimated value, is computed. And then, the above waiting period (Δt) is computed by deducting the delay period (Δt1) from the required period (Δt2).

In next step S312, the accessory driving torque computed in step S304 is delayed by the waiting period (Δt). Then, the delayed accessory driving torque is added to other demanded torque, which includes the torque required by the vehicle driver. The resultant value is output to the engine controller 10 as the conclusive demanded torque value. The demanded torque value output to the engine controller 10 is shown in time chart 17C.

In next step S314, it is determined whether the waiting period (Δt) has passed. This determination processing is performed over again until the waiting period (Δt) has passed. And the processing of next step S316 is performed when the waiting period (Δt) has passed after the request for granting permission to drive the accessory device 26 was input.

In step S316, the accessories controller 28 is permitted to drive the accessory device 26. A flag of granting permission to drive accessories is shown to the accessories controller 28 by the power train manager 12. As shown in time chart 17G, when this flag turns ON, permission to drive the accessory device 26 is considered to be granted. The accessories controller 28 starts to drive the accessory device 26 after being permitted to drive by the power train manager 12.

In parallel with the above-mentioned processing, original processing is performed in the engine controller 10. At first, the torque demand output in above-mentioned step S312 is input to the target torque computing unit 102 of the engine controller 10. The target torque computing unit 102 computes the target torque of the engine 2 on the basis of the input torque demand. The computed target torque is output to the target torque correcting unit 108.

Also, the accessory driving torque as the future information output in above-mentioned step S316 is input to the target efficiency computing unit 104 of the engine controller 10. The target efficiency computing unit 104 computes the target efficiency by using the input accessory driving torque. Specifically, the accessory driving torque is used as the future target, and a ratio of the current target torque to the future target is computed as the target efficiency. The computed result of the target efficiency is shown in time chart 17D. The computed target efficiency is output to the target torque correcting unit 108.

Time chart 17E shows a result of the target opening angle computed by the throttle opening angle computing unit 112. Because a ratio of the target torque to the future target, which corresponds to the accessory driving torque, is output as the target efficiency, the value of the corrected target torque computed in the target torque correcting unit 108 matches the future target. As a result, the target opening angle of the throttle 4 is enlarged immediately to the opening angle appropriate for the future target.

Also, time chart 17F shows a result of the conclusive ignition timing computed by the ignition timing computing unit 114. As a result that the throttle 4 is opened up as shown in time chart 17E, the intake air amount increases rapidly, which increases the estimated torque computed in the estimated torque computing unit 106. Because the torque efficiency, which is the basis for the computation of the ignition retard quantity, is a ratio of the target torque to the estimated torque, the torque efficiency decreases in response to an increase of the intake air amount, and the ignition timing is retarded with a decrease of the torque efficiency. Later, at the timing when the target torque matches the future target, the ignition timing is returned to the MBT.

As mentioned above, the control device of the present embodiment has a characteristic feature on the control for driving the accessory device 26. In the following, the effects caused by the control are explained all together.

Receiving a request for granting permission to drive the accessory device 26 from the accessories controller 28, the power train manager 12 calculates the future target of torque based on the torque necessary for driving the accessory device 26, that is the accessory driving torque, and computes from the operating condition of the engine 2 the period (Δt2) required to realize the future target. Then, the power train manager 12 permits the accessories controller 28 to drive the accessory device 26 after the elapse of the waiting period (Δt) that is set in accordance with the required period (Δt2). In parallel with this processing, the power train manager 12 outputs instructions as future information to the engine controller 10 so as to operate in advance the throttle 4 as the main-actuator for realizing the future target. Such advancing operation of the throttle 4 before granting permission to drive the accessory device 26 makes it possible to ensure the rapid realization of the torque necessary for driving the accessory device 26.

Further, the power train manager 12 outputs instructions (future information) to the engine controller 10 so as to operate the ignition system 6 as the sub-actuator for cancelling the torque change induced by that the throttle opening angle is enlarged during the period from a time when the throttle opening angle is enlarged until a permission to drive the accessory device 26 is granted. When the ignition timing is retarded by the ignition system 6, it becomes possible to suppress an unnecessary torque change before the start of the drive of the accessory device 26. Also, it is possible to minimize the period during which the ignition timing is retarded since the waiting period (Δt) is neither too short nor too long to realize the target torque that is appropriate for the accessory driving torque, and the ignition system 6 is operated to retard the ignition timing within the above waiting period (Δt).

Furthermore, the power train manager 12 sets the above waiting period (Δt) while taking the delay period (Δt1) arising from the operating characteristics of the accessory device 26 in consideration. This makes it possible to prevent imbalance from arising between the output torque of the engine 2 and the consumed torque due to the actuation of the accessory device 26, thereby making it possible for the vehicle drive unit to keep the desired torque as a whole. Also, the period during which the ignition timing is retarded is minimized by the optimization of the waiting period (Δt).

In the present embodiment, the accessory device 26 and accessories controller 28 constitute the "torque consuming element" of the sixth aspect of the present invention. Also, performing the processing of step S302, S304 and S306 by the power train manager 12 is equivalent to the "future target setting means" of the sixth aspect of the present invention, and performing the processing of step S308 and S310 by the power train manager 12 is equivalent to the "required period computing means" of the sixth aspect of the present invention. The target efficiency computing unit 104, target torque correcting unit 108, throttle opening angle computing unit 112 and throttle driver 116 in the engine controller 10 constitute the "main-actuator control means" of the sixth aspect of the present invention. The target efficiency computing unit 104, torque efficiency computing unit 110, ignition timing computing unit 114 and ignition driver 118 constitute the "sub-actuator control means" of the sixth aspect of the present invention.

Others

While the present invention has been described in terms of preferred embodiments, it should be understood that the invention is not limited to the preferred embodiments described above, and that variations may be made without departure from the scope and spirit of the invention. For example, the following modifications may be made to the preferred embodiments of the present invention.

The first embodiment assumes that the torque regulation reserved on the engine 2 by the power train manager 12 is to regulate the torque to increase. However, according to the configuration of the control device as the first embodiment, it is possible to deal with the regulation toward decreasing the torque. In this case, the throttle 4 is closed in advance of the torque down realization timing, and the ignition timing is advanced to cancel out a torque change induced by the reduction of the throttle opening angle. Much the same is true on the second embodiment and third embodiment.

The fourth embodiment assumes that the accessories controller 28 requests the power train manager 12 to grant permission to drive the accessory device 26. However, according to the configuration of the control device as the fourth embodiment, it is possible to deal with the stoppage of the accessory device 26. In this case, when the accessories controller 28 requests granting permission to stop the accessory device 26, the throttle 4 is closed before the stoppage of the accessory device 26 is permitted, and the ignition timing is advanced to cancel out a torque change induced by the reduction of the throttle opening angle.

Also, according to the configuration of the control device as the fourth embodiment, it is possible to deal with changing step-by-step or continuously the drive amount namely the torque consumption of the accessory device 26 as well as the drive and stoppage of the accessory device 26. If, for example, the accessory device 26 is an alternator, when the accessories controller 28 requests granting permission to change the power generation of the alternator, the opening angle of the throttle 4 is changed before changing the power generation is permitted, and the ignition timing is changed to cancel out a torque change induced by the change of the throttle opening angle.

In the fourth embodiment, the engine controller 10 comprising the control device may be rearranged to the engine controller 30 having the configuration shown in FIG. 12. Both engine controllers 10, 30 are similar on the point that they perform computations by use of the torque demand and future information supplied from the power train manager 12. As is evident from a comparison of the effect obtained by the first embodiment and the effect obtained by the third embodiment, the same control effect can be obtained even if either engine controller 10,30 is used.

In the first embodiment, the engine controller 10 may be integrated with the power train manager 12 to be configured as one apparatus. If a control result same as the first embodiment can be realized, that is, the operation of the main-actuator and sub-actuator same as the first embodiment can be realized, there is no functional restriction about individual computational elements comprising the control device. Much the same is true on the second embodiment, third embodiment and fourth embodiment.

In the first embodiment, it is allowed to use a valve lift amount variable system, which varies the maximum lift amount of the air intake valve, as the main-actuator 4 in place of the throttle. In this case, it is necessary to change the configuration in the engine controller 10. A computational element for computing the maximum lift amount of the air intake valve on the basis of the corrected target torque should be installed in place of the throttle opening angle computing unit 112. Much the same is true on the second embodiment, third embodiment and fourth embodiment.

Also, in the first embodiment, it is allowed to use a valve lift amount variable system, which varies the maximum lift amount of the air intake valve, as the sub-actuator 6 in place of the ignition system. When the valve lift amount variable system is compared with the throttle as the main-actuator 4, the valve lift amount variable system can make the torque respond to its operation more promptly than the throttle. Thus, the valve lift amount variable system can be used as the sub-actuator. In this case, too, it is necessary to change the configuration in the engine controller 10. A computational element for computing the maximum lift amount of the air intake valve on the basis of the torque efficiency should be installed in place of the ignition timing computing unit 114. Much the same is true on the second embodiment, third embodiment and fourth embodiment.

In addition, a fuel injection system, exhaust gas recirculation system or compression ratio variable system can be used as the main-actuator or sub-actuator. Also, in the case of the engine comprising the turbocharger with the motor assist (MAT), the MAT can be used as the sub-actuator. Further, as for the first embodiment, second embodiment and third embodiment, an accessory device driven by the engine such as an alternator can be used as the sub-actuator. The torque, specifically the effective torque, of the engine 2 can be regulated indirectly by controlling the torque consumption of the accessory device.

The invention claimed is:

1. A control device for a vehicle drive unit having an internal combustion engine as a power plant, the control device comprising:
    vehicle control means which performs control concerning the drive condition of a vehicle by regulating a torque output by the internal combustion engine;
    a main-actuator used for regulating the torque of the internal combustion engine;
    a sub-actuator which makes the torque respond to its operation more promptly than the main-actuator does, and is used for torque regulation of the internal combustion engine independently of the main-actuator;
    reservation information taking means which receives a reservation of torque regulation supplied from the vehicle control means to the internal combustion engine, and takes as reservation information at least a future target of the torque that is going to be output from the internal combustion engine and a realization timing of the future target;
    required period computing means which computes based on a current engine operating condition the period required to realize the future target under a situation in which the torque of the internal combustion engine is regulated by operating the main-actuator;
    wherein, in a first operating mode,
        a main-actuator control means starts the operation of the main-actuator at the timing preceding the realization timing by the required period for realizing the future target; and
        a sub-actuator control means operates the sub-actuator to cancel the torque change induced by the operation of the main-actuator during the period from the start of the operation of the main-actuator to the realization timing.

2. The control device for a vehicle drive unit according to claim 1, wherein
   the reservation information taken by the reservation information taking means includes a start timing of the torque regulation and a time change rate of torque approaching to the future target;
   wherein, in a second operating mode,
      the main-actuator control means starts the operation of the main-actuator at the start timing of the torque regulation when the time change rate is possible to be realized by the main-actuator; and
      the sub-actuator control means operates the sub-actuator to cancel the torque change induced by the operation of the main-actuator during the period from the start of the operation of the main-actuator to the realization timing.

3. The control device for a vehicle drive unit according to claim 1, further comprising:
   determination means for determining whether the period remaining before the realization timing is enough for the required period;
   wherein in a third operating mode,
      the main-actuator control means starts the operation of the main-actuator immediately when the remaining period is not enough for the required period; and
      the sub-actuator control means operates the sub-actuator when a condition of that the remaining period is enough for the required period is satisfied.

4. The control device for a vehicle drive unit according to claim 1, wherein
   the internal combustion engine is a spark-ignited internal combustion engine;
   the main-actuator is an actuator that regulates an intake air amount of the internal combustion engine; and
   the sub-actuator is an actuator that regulates an ignition timing of the internal combustion engine.

5. The control device for a vehicle drive unit according to claim 4, wherein the torque regulation reserved on the internal combustion engine by the vehicle control means is to regulate the torque to increase.

\* \* \* \* \*